(12) United States Patent
Brahmbhatt et al.

(10) Patent No.: US 10,670,249 B1
(45) Date of Patent: Jun. 2, 2020

(54) SYSTEMS AND METHODS FOR SEARCH AND LANDING LIGHT

(71) Applicant: HONEYWELL INTERNATIONAL INC., Morris Plains, NJ (US)

(72) Inventors: Kartik Brahmbhatt, Gujarat (IN); Gokul Murugesan, Karnataka (IN); Abhijit Kulkarni, Karnataka (IN)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 0 days.

(21) Appl. No.: 16/280,162

(22) Filed: Feb. 20, 2019

(51) Int. Cl.
| | |
|---|---|
| F21V 23/00 | (2015.01) |
| F21V 23/04 | (2006.01) |
| B64D 47/04 | (2006.01) |
| F21S 41/657 | (2018.01) |
| F21W 107/30 | (2018.01) |
| F21Y 107/20 | (2016.01) |

(52) U.S. Cl.
CPC ............ F21V 23/003 (2013.01); B64D 47/04 (2013.01); F21S 41/657 (2018.01); F21V 23/0442 (2013.01); F21W 2107/30 (2018.01); F21Y 2107/20 (2016.08)

(58) Field of Classification Search
CPC .. F21V 23/003; F21V 23/0442; F21S 41/657; B64D 47/04; F21Y 2107/20; F21W 2107/30
USPC .......................................................... 315/77
See application file for complete search history.

(56) References Cited

U.S. PATENT DOCUMENTS

| | | | |
|---|---|---|---|
| 7,672,760 B2 * | 3/2010 | Solberg | .................. B63B 45/02 701/21 |
| 8,836,541 B2 | 9/2014 | Fidanza | |
| 9,635,739 B2 | 4/2017 | Schoen et al. | |
| 9,650,154 B2 | 5/2017 | Cook et al. | |
| 2013/0107513 A1 * | 5/2013 | Lundberg | ................ F21V 14/04 362/231 |
| 2014/0375216 A1 * | 12/2014 | Seidmann | .......... H05B 33/0845 315/149 |
| 2016/0107767 A1 * | 4/2016 | Jha | ......................... B64D 47/02 362/470 |
| 2016/0128157 A1 * | 5/2016 | Ulivella | ............. H05B 33/0863 315/294 |
| 2018/0170577 A1 | 6/2018 | Hessling-Von Heimendahl et al. | |

OTHER PUBLICATIONS

LFD Limited; Dual Mode Search Light HID visible. LED infra-red, Sep. 6.

(Continued)

*Primary Examiner* — Don P Le
(74) *Attorney, Agent, or Firm* — Lorenz & Kopf, LLP

(57) ABSTRACT

A search and landing light system for a vehicle includes a hemispherical housing adapted to couple to the vehicle and a plurality of light emitting elements coupled to the hemispherical housing and arranged about a surface of the hemispherical housing. Each of the plurality of light emitting elements is configured to output a light beam. The search and landing light system includes a controller, having a processor in communication with each of the plurality of light emitting elements and configured to output one or more control signals to selectively activate at least one of the plurality of light emitting elements to output the light beam at a selected position relative to the vehicle.

18 Claims, 15 Drawing Sheets

(56) References Cited

OTHER PUBLICATIONS

HID Searchlight; HID Searchlight LTG Global; Retrieved from Internet [https://www.ltgglobal.com/aerospace/rotor-wing/searchlights/hid-searchlight/]; Copyright © 2019 Luminator Technology Group.

* cited by examiner

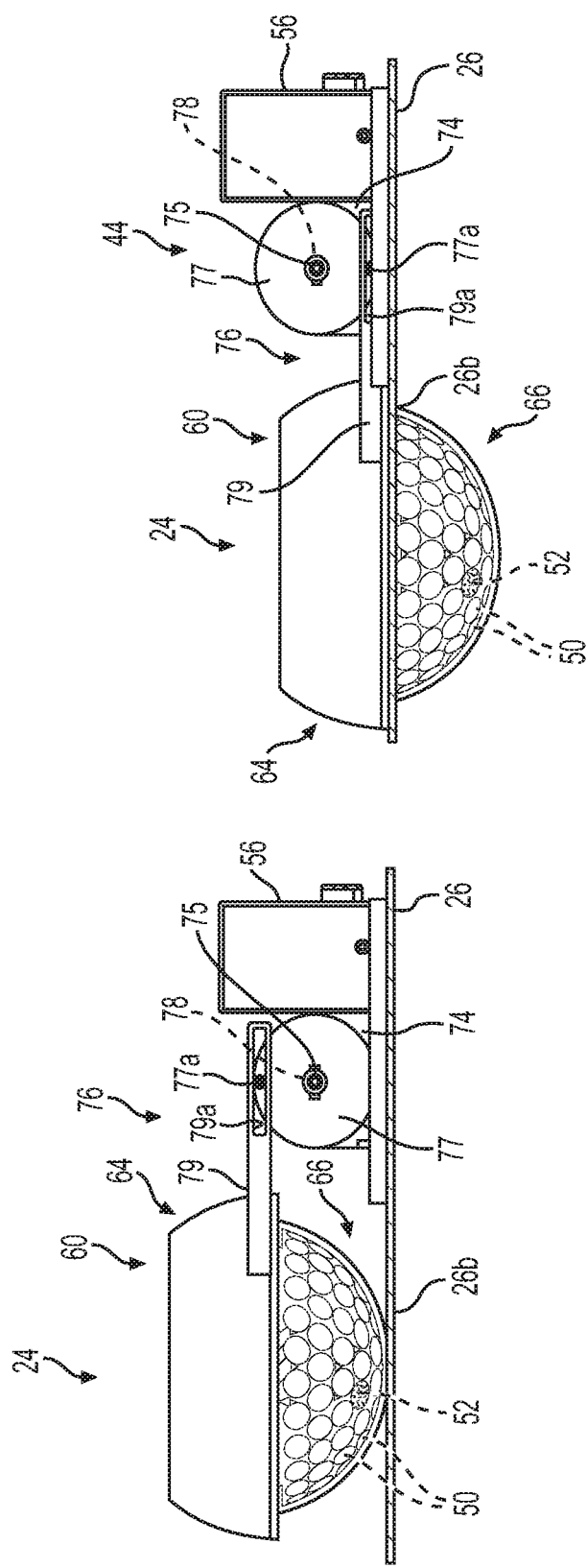

SYSTEMS AND METHODS FOR SEARCH AND LANDING LIGHT

TECHNICAL FIELD

The present disclosure generally relates to lighting systems for a mobile platform, and more particularly relates to systems and methods for a search and landing light for use with a mobile platform.

BACKGROUND

Generally, mobile platforms, such as rotorcraft, employ various lighting systems to illuminate areas outside of the rotorcraft for landing, inspecting, etc. In order to position the light beam output by the lighting system at a desired orientation, numerous mechanical actuators are employed to move the light to output the light beam at the desired orientation. Given the sometimes harsh operating environment of the lighting system, the numerous mechanical actuators generally require service and/or replacement to ensure performance, which results in downtime for the rotorcraft. In addition, the numerous mechanical actuators increase a mass of the lighting system, which is undesirable for a rotorcraft.

Accordingly, it is desirable to provide systems and methods for a search and landing light for a mobile platform, in which a number of mechanical actuators employed to position the light source is reduced to provide mass savings and reduce service time. Furthermore, other desirable features and characteristics of the present invention will become apparent from the subsequent detailed description and the appended claims, taken in conjunction with the accompanying drawings and the foregoing technical field and background.

SUMMARY

According to various embodiments, provided is a search and landing light system for a vehicle. The search and landing light system includes a hemispherical housing adapted to couple to the vehicle and a plurality of light emitting elements coupled to the hemispherical housing and arranged about a surface of the hemispherical housing. Each of the plurality of light emitting elements is configured to output a light beam. The search and landing light system includes a controller, having a processor in communication with each of the plurality of light emitting elements and configured to output one or more control signals to selectively activate at least one of the plurality of light emitting elements to output the light beam at a selected position relative to the vehicle.

The search and landing light system further includes at least one sensor positioned within the hemispherical housing and in communication with the controller. The at least one sensor is selected from the group comprising an attitude and heading reference system and an inertial measurement unit. The search and landing light system includes at least one imaging device coupled to the surface of the hemispherical housing, and the at least one imaging device is configured to generate an image data stream. The search and landing light system includes a source of input data that provides a mode for an operation of the search and landing light system, and the controller is configured to output the one or more control signals to the at least one of the plurality of light emitting elements based on the mode. The mode is a slew mode, and the controller is configured to output the one or more control signals to the at least one of the plurality of light emitting elements based on the slew mode. The mode is a home mode, and the controller is configured to output the one or more control signals to the at least one of the plurality of light emitting elements to output the light beam in a fixed orientation relative to the vehicle. The mode is an object tracking mode, the source of input data further comprises a target for tracking, and the controller is configured to output the one or more control signals to the at least one of the plurality of light emitting elements to output the light beam to illuminate the target. The search and landing light system includes at least one imaging device coupled to the surface of the hemispherical housing, and the controller is configured to determine an amount of correction for the output of the light beam based on an image data stream received from the at least one imaging device. The source of input is a human-machine interface in communication with the controller and remote from the hemispherical housing. The search and landing light system further includes an actuator assembly coupled to the hemispherical housing and adapted to couple to the vehicle, the actuator assembly in communication with the controller and responsive to one or more control signals from the controller to extend or retract the hemispherical housing relative to the vehicle.

Also provided is a method for generating a search and landing light. The method includes receiving, by a processor, a source of a mode of operation for at least one light associated with a mobile platform. The method includes determining, by the processor, based on the mode, at least one light emitting element of a plurality of light emitting elements coupled to a surface of a hemispherical housing to activate to emit a light beam. The method includes outputting, by the processor, one or more control signals to the at least one light emitting element of the plurality light emitting elements to output the light beam based on the mode.

The receiving, by the processor, the source of the mode of operation for the at least one light further includes receiving, by the processor, a normal slew mode or true slew mode of operation for the at least one light. The method further includes determining, by the processor, based on the normal slew mode or true slew mode, the at least one light emitting element of the plurality of light emitting elements to activate to output the light beam; and outputting, by the processor, the one or more control signals to the at least one light emitting element of the plurality light emitting elements to output the light beam based on the normal slew mode or true slew mode. The receiving, by the processor, the source of the mode of operation for the at least one light includes: receiving, by the processor, a source of a position for the light beam; determining, by the processor, based on the position, the at least one light emitting element of the plurality of light emitting to activate to output the light beam; and outputting, by the processor, the one or more control signals to the at least one light emitting element of the plurality light emitting elements to output the light beam at the position. The receiving, by the processor, the source of the mode of operation for the at least one light further includes: receiving, by the processor, a source of a target for tracking with the light beam and sensor data from a sensor coupled to the hemispherical housing; determining, by the processor, a current position of the light beam on ground based on the sensor data; receiving, by the processor, an image data stream from at least one imaging device coupled to the surface of the hemispherical housing; determining, by the processor, based on the image data stream, whether a position of the light beam is different from the current position of the light beam; determining, by the processor, an amount of correction based on the determining that the position of the light beam is different; determining, by the processor, based on the amount of correction, the at least one light emitting element of the plurality of light emitting to activate to output a corrected light beam; and outputting, by the processor, one or more control signals to the at least one light emitting element of the plurality light emitting elements to output the corrected light beam. The method further includes receiving, by the processor, an image data stream from at least one imaging device coupled to the surface of the hemispherical housing; and generating, by the processor, user interface data for rendering a user interface on a display associated with the vehicle that includes the image data stream.

Further provided according to various embodiments is a search and landing light system for a vehicle. The search and landing light system includes a human-machine interface including an input device that receives a mode of operation for the search and landing light system. The search and landing light system includes a housing adapted to couple to the vehicle and a plurality of light emitting elements coupled to the housing and arranged about a surface of the housing. Each of the plurality of light emitting elements is configured to output a light beam. The search and landing light system includes a controller, having a processor in communication with each of the plurality of light emitting elements and the human-machine interface. The controller is configured to output one or more control signals to selectively activate at least one of the plurality of light emitting elements to output the light beam based on the mode.

In addition, the search and landing light system further includes at least one imaging device coupled to the surface of the housing that generates an image data stream and a display associated with the human-machine interface. The controller is configured to generate user interface data for rendering a user interface on the display that includes the image data stream. The search and landing light system includes an actuator assembly coupled to the housing and adapted to couple to the vehicle. The actuator assembly is in communication with the controller and responsive to one or more control signals from the controller to extend or retract the housing relative to the vehicle. In one example, the mode is an object tracking mode, and the human-machine interface receives a target for tracking. The controller is configured to output the one or more control signals to the at least one of the plurality of light emitting elements to output the light beam to illuminate the target.

DESCRIPTION OF THE DRAWINGS

The exemplary embodiments will hereinafter be described in conjunction with the following drawing figures, wherein like numerals denote like elements, and wherein:

FIG. 2A is a rear side view of the light system of the search and landing light system of FIG. 1, in which the light system is in the first, retracted position and an actuator system includes a first exemplary gear train;

FIG. 2B is a rear side view of the light system of the search and landing light system of FIG. 1, in which the light system is in a second, extended position and an actuator system includes the first exemplary gear train;

DETAILED DESCRIPTION

Figure 1:
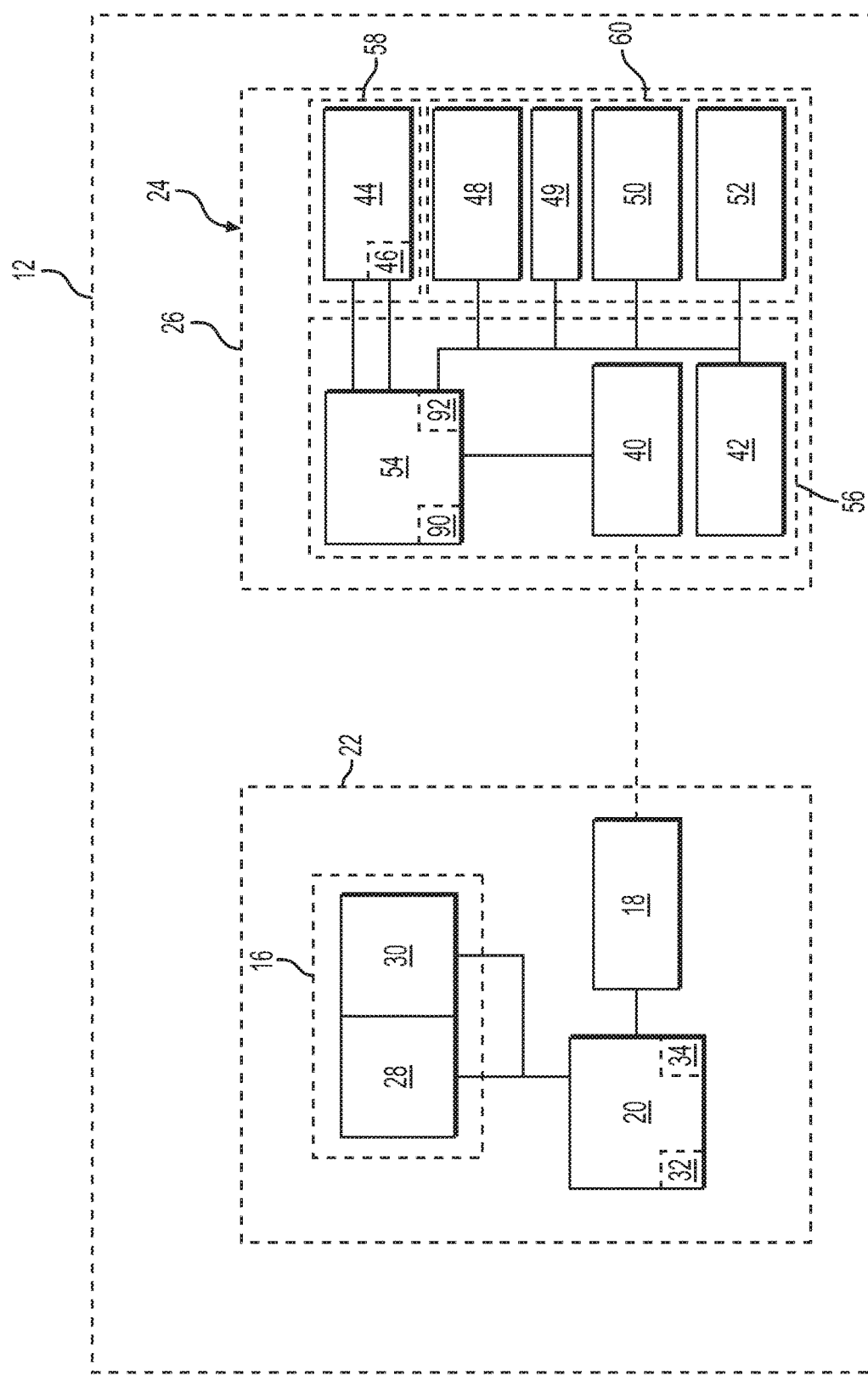
FIG. 1 is a functional block diagram illustrating a search and landing light system for a mobile platform, such as a rotorcraft, in accordance with the various teachings of the present disclosure.

The following detailed description is merely exemplary in nature and is not intended to limit the application and uses. Furthermore, there is no intention to be bound by any expressed or implied theory presented in the preceding technical field, background, brief summary or the following detailed description. In addition, those skilled in the art will appreciate that embodiments of the present disclosure may be practiced in conjunction with any type of light system, and the search and landing light for a mobile platform is merely one exemplary embodiment according to the present disclosure. In addition, while the search and landing light is described herein as being employed with a mobile platform, such as a bus, motorcycle, train, motor vehicle, marine vessel, aircraft, rotorcraft, unmanned aerial vehicle and the like, the various teachings of the present disclosure can be used with a stationary platform. Further, it should be noted that many alternative or additional functional relationships or physical connections may be present in an embodiment of the present disclosure. In addition, while the figures shown herein depict an example with certain arrangements of elements, additional intervening elements, devices, features, or components may be present in an actual embodiment. It should also be understood that the drawings are merely illustrative and may not be drawn to scale.

As used herein, the term "axial" refers to a direction that is generally parallel to or coincident with an axis of rotation, axis of symmetry, or centerline of a component or components. For example, in a cylinder or disc with a centerline and generally circular ends or opposing faces, the "axial" direction may refer to the direction that generally extends in parallel to the centerline between the opposite ends or faces. In certain instances, the term "axial" may be utilized with respect to components that are not cylindrical (or otherwise radially symmetric). For example, the "axial" direction for a rectangular housing containing a rotating shaft may be viewed as a direction that is generally parallel to or coincident with the rotational axis of the shaft. Furthermore, the term "radially" as used herein may refer to a direction or a relationship of components with respect to a line extending outward from a shared centerline, axis, or similar reference, for example in a plane of a cylinder or disc that is perpendicular to the centerline or axis. In certain instances, components may be viewed as "radially" aligned even though one or both of the components may not be cylindrical (or otherwise radially symmetric). Furthermore, the terms "axial" and "radial" (and any derivatives) may encompass directional relationships that are other than precisely aligned with (e.g., oblique to) the true axial and radial dimensions, provided the relationship is predominately in the respective nominal axial or radial direction. As used herein, the term "transverse" denotes an axis that crosses another axis at an angle such that the axis and the other axis are neither substantially perpendicular nor substantially parallel.

As used herein, the term module refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of schematic, functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of systems, and that the search and landing light system described herein is merely exemplary embodiments of the present disclosure.

For the sake of brevity, conventional techniques related to signal processing, data transmission, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

FIG. 1 is a functional block diagram of a search and landing light system 10 for a mobile platform, such as a rotorcraft 12, according to various embodiments. It should be noted that the rotorcraft 12 is merely one example of a mobile platform, and as discussed, the search and landing light system 10 may be employed on various mobile platforms, including aircraft. In one example, the search and landing light system 10 includes a human-machine interface 16, a communication device 18 and a controller 20, which may be within a cabin 22 of the rotorcraft 12, for example, and at least one light system 24 which may be coupled to a fuselage 26 the rotorcraft 12 and is generally remote from the human-machine interface 16. As will be discussed, the light system 24 is in communication with the controller 20 via the communication device 18 to activate or deactivate the light system 24; to move the light system 24 from a first, retracted position to a second, extended position; and to provide image data for tracking one or more objects with the light system 24. It should be noted that while the human-machine interface 16, the communication device 18 and the controller 20 are described herein as being within the cabin 22 of the rotorcraft 12, such as a vehicle-based interface for the light system 24, the human-machine interface 16, the communication device 18 and the controller 20 may be associated with a portable electronic device, including, but not limited to, an electronic flight bag, a tablet, smart phone, etc.

The human-machine interface 16 is in communication with the controller 20 via a suitable communication medium, such as a bus. The human-machine interface 16 may be configured in a variety of ways. In some embodiments, the human-machine interface 16 may include various switches, one or more buttons, a touchscreen interface 28 that may be overlaid on a display 30, a keyboard, a joystick, an audible device, a microphone associated with a speech recognition system, or various other human-machine interface devices. In one example, the touchscreen interface 28 may receive input from the user, such as a position for the light system 24. The touchscreen interface 28 may include, but is not limited to, a resistive touchscreen panel, a capacitive touchscreen panel, a projected capacitance touchscreen panel, a surface capacitive touchscreen panel, a surface acoustic wave touchscreen panel, etc. Generally, upon the receipt input from the user, the human-machine interface 16 transmits a signal to the controller 20. As will be discussed, the controller 20 transmits the signal from the human-machine interface 16, via the communication device 18, to the light system 24.

The display 30 comprises any suitable technology for displaying information, including, but not limited to, a liquid crystal display (LCD), organic light emitting diode (OLED), plasma, or a cathode ray tube (CRT). In this example, the display 30 is an electronic display capable of graphically displaying one or more user interfaces under the control of the controller 20. Those skilled in the art may realize other techniques to implement the display 30 in the search and landing light system 10.

The communication device 18 comprises any suitable system for receiving data from and transmitting data to the light system 24. For example, the communication device 18 may achieve bi-directional communications with the light system 24 over Bluetooth® or by utilizing a Wi-Fi standard, i.e., one or more of the 802.11 standards as defined by the Institute of Electrical and Electronics Engineers ("IEEE"), as is well known to those skilled in the art. Thus, the communication device 18 includes, but is not limited to, a Bluetooth® transceiver and/or a Wi-Fi transceiver. Further, it should be noted that the communication device 18 is optional, as the light system 24 may be in communication with the controller 20 over a suitable architecture associated with the rotorcraft 12 that enables the transfer of power, data, commands, including, but not limited to, a bus.

The controller 20 includes at least one processor 32 and a computer readable storage device or media 34. The processor 32 can be any custom made or commercially available processor, a central processing unit (CPU), a graphics processing unit (GPU), an auxiliary processor among several processors associated with the controller 20, a semiconductor based microprocessor (in the form of a microchip or chip set), a macroprocessor, any combination thereof, or generally any device for executing instructions. The computer readable storage device or media 34 may include volatile and nonvolatile storage in read-only memory (ROM), random-access memory (RAM), and keep-alive memory (KAM), for example. KAM is a persistent or non-volatile memory that may be used to store various operating variables while the processor 32 is powered down. The computer-readable storage device or media 34 may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 20 in controlling components associated with the search and landing light system 10.

The instructions may include one or more separate programs, each of which comprises an ordered listing of executable instructions for implementing logical functions. The instructions, when executed by the processor 32, receive and process input signals, perform logic, calculations, methods and/or algorithms for controlling the components of the search and landing light system 10 of the rotorcraft 12, and generate signals to components of the search and landing light system 10 to control light output by the light system 24 based on the logic, calculations, methods, and/or algorithms. Although only one controller 20 is shown in FIG. 1, embodiments of the rotorcraft 12 can include any number of controllers 20 that communicate over any suitable communication medium or a combination of communication mediums and that cooperate to process the signals from the human-machine interface 16, process signals from the light system 24, perform logic, calculations, methods, and/or algorithms, and generate control signals to control features of the light system 24.

In various embodiments, one or more instructions of the controller 20 are associated with the search and landing light system 10 and, when executed by the processor 32, the instructions receive and process signals from the human-machine interface 16 to determine input received from a user to control the light system 24. For example, as will be discussed herein, the instructions of the controller 20, when executed by the processor 32, determine whether an input is received to operate the light system 24 in a slew mode, a home mode, an object tracking mode or to dim the light system 24.

In one example, the light system 24 includes a light communication device 40, a power source 42, an actuator assembly 44, an actuator position sensor 46, an attitude and heading sensor 48, a system position sensor 49, one or more light emitting elements 50, one or more imaging devices 52 and a light controller 54. As will be discussed, in one example, the light communication device 40, the power source 42 and the light controller 54 are contained or disposed within a first housing 56, the actuator assembly 44 is disposed at least partially in a second housing 58, and the attitude and heading sensor 48, the system position sensor 49, the light emitting elements 50 and the imaging devices 52 are disposed in a third housing 60. It should be noted, in other embodiments, a single housing may contain all of the components of the light system 24.

Figure 2:
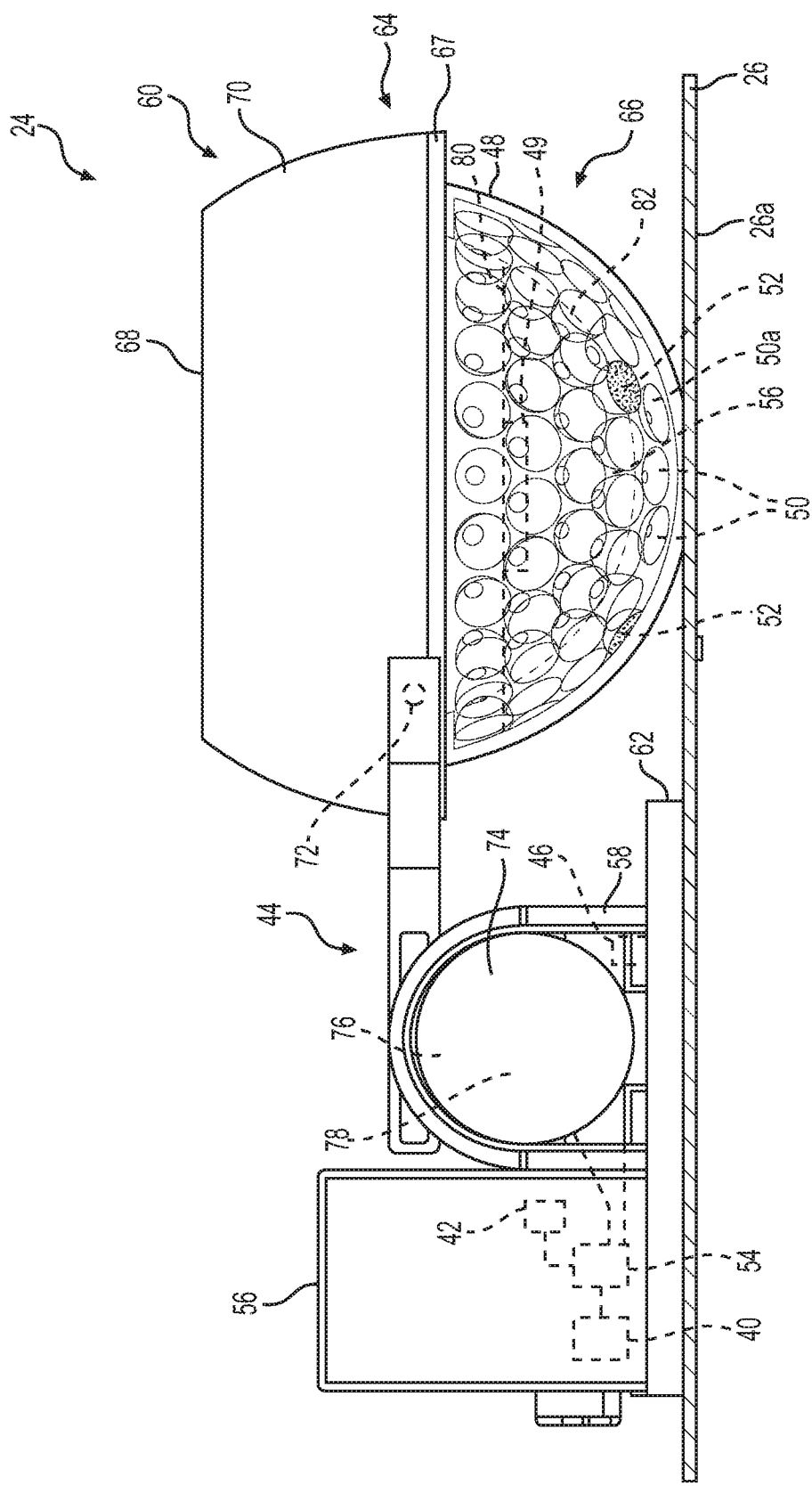
FIG. 2 is a front side view of a light system of the search and landing light system of FIG. 1, in which the light system is in a first, retracted position, in accordance with the various teachings of the present disclosure.

In one example, with reference to FIG. 2, the first housing 56 and the second housing 58 are fixedly coupled to the rotorcraft 12, while the third housing 60 is movable, via the actuator assembly 44, relative to the fuselage 26 of the rotorcraft 12. In other embodiments, the third housing 60 may be fixed to the fuselage 26. Thus, in certain embodiments, the light system 24 need not include the actuator assembly 44 and the actuator position sensor 46. In this example, the first housing 56 is substantially rectangular and the second housing 58 is substantially U-shaped, but the first housing 56 and the second housing 58 may have any desired shape. In one example, the first housing 56 and the second housing 58 are each coupled to a base plate 62, and the base plate 62 is fixedly coupled to the fuselage 26. The base plate 62 may be composed of metal, metal alloy or a polymer-based material, and serves to provide a mounting surface for the first housing 56 and the second housing 58 within the fuselage 26 of the rotorcraft 12. It should be noted that other mounting configurations are possible. The first housing 56 and the second housing 58 are each composed of a metal, metal alloy or polymer-based material, and may be formed through stamping, casting, machining, additive manufacturing, etc.

The third housing 60 includes a first housing portion 64 and a second housing portion 66, which cooperate to enclose the attitude and heading sensor 48, the light emitting elements 50 and the imaging devices 52. In this example, the first housing portion 64 is cup-shaped, and includes a base 68 and a sidewall 70. The base 68 is circular, and the sidewall 70 extends axially from the base 68. The sidewall 70 is coupled to the actuator assembly 44 to enable the movement of the third housing 60 relative to the fuselage 26. In one example, the sidewall 70 may include one or more pins 72, which are coupled to the actuator assembly 44; however, various techniques may be used to couple the third housing 60 to the actuator assembly 44, including, but not limited to threaded fasteners, locking pins, dowel pins, splines composed of any desired material, size and shape. The first housing portion 64 is composed of a metal, metal alloy or polymer-based material, and may be formed through stamping, casting, machining, additive manufacturing, etc. The second housing portion 66 is coupled to the first housing portion 64. The second housing portion 66 is substantially hemispherical, and may be hemispherical, semi-ellipsoid or paraboloid. In one example, the second housing portion 66 is transparent, such that light emitted by the light emitting elements 50 may pass through the second housing portion 66. In various embodiments, the second housing portion 66 may comprise an optical lens, including, but not limited to an individual total internal reflector (TIR) lens, a Fresnel lens or optical reflectors, which may serve to disperse the light emitted by the light emitting elements 50 while protecting the light emitting elements 50 from the environment. Thus, in this example, the second housing portion 66 may be composed of a polymer-based material, which is transparent, and may be molded, printed, etc.

In one example, with reference to FIG. 2, the second housing portion 66 is coupled to the first housing portion 64 via a retaining ring 67. The retaining ring 67 may be composed of a metal, metal alloy or polymer-based material, and in one example, is composed of polycarbonate. The retaining ring 67 defines an opening to enable the retaining ring 67 to be positioned about the second housing portion 66. In one example, the retaining ring 67 is coupled to the second housing portion 66 via a potting compound, mechanical fasteners, etc. In other examples, the second housing portion 66 may include a flange about a circumference of the second housing portion 66, and the retaining ring 67 may be positioned about the flange to couple the retaining ring 67 to the second housing portion 66. The retaining ring 67 also includes a coupling flange with a plurality of threads, for example, which threadably engages with a plurality of threads defined in the first housing portion 64 to couple the second housing portion 66 to the first housing portion 64. It should be noted that in other embodiments, the retaining ring 67 may be coupled to the first housing portion 64 through another technique such as ultrasonic welding, mechanical fasteners, etc. In addition, in other embodiments, the first housing portion 64 may be coupled to the second housing portion 66 using another technique, including, but not limited to, mechanical fasteners, welding, adhesives, etc.

The light communication device 40 comprises any suitable system for receiving data from and transmitting data to the communication device 18 associated with the controller 20. For example, the light communication device 40 may achieve bi-directional communications with the communication device 18 associated with the controller 20 over Bluetooth® or by utilizing a Wi-Fi standard, i.e., one or more of the 802.11 standards as defined by the Institute of Electrical and Electronics Engineers ("IEEE"), as is well known to those skilled in the art. Thus, the light communication device 40 includes, but is not limited to, a Bluetooth® transceiver and/or a Wi-Fi transceiver. Further, it should be noted that the light communication device 40 is optional, as the light controller 54 of the light system 24 may be in communication with the controller 20 over a suitable architecture associated with the rotorcraft 12 that enables the transfer of power, data, commands, including, but not limited to, a bus.

The power source 42 includes a current source that supplies current to the light system 24. In one example, the current source is a direct current source (DC), such as a DC-DC converter, for example, a buck converter fed from a power supply associated with the rotorcraft 12. In order to realize the DC-DC converter topology, wide-bandgap power devices may be employed, including, but not limited to, gallium nitride. The use of wide-bandgap devices reduce the size of filters and overall electronic circuitry required, while improving thermal performance and reducing power loss. As will be discussed, the light controller 54 is in communication with the power source 42 to direct current to selected ones of the light emitting elements 50. The light controller 54 is also in communication with the power source 42 to supply current to the actuator assembly 44, the actuator position sensor 46, the attitude and heading sensor 48, the system position sensor 49, the at least one imaging device 52 and the light communication device 40.

Figure 3:
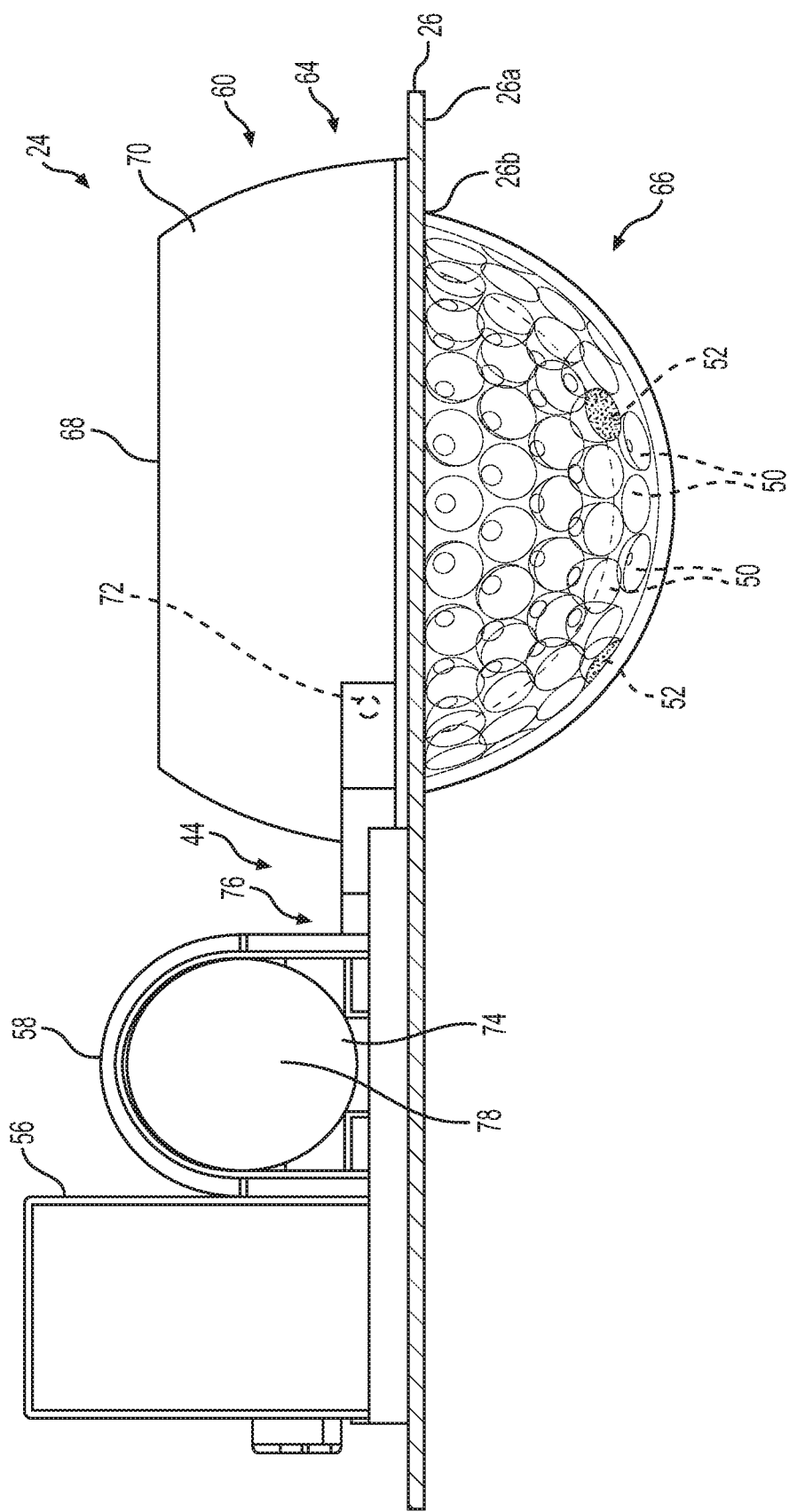
FIG. 3 is a front side view of the light system of the search and landing light system of FIG. 1, in which the light system is in the second, extended position, in accordance with the various teachings of the present disclosure.

The actuator assembly 44 is in communication with the light controller 54 and is responsive to one or more control signals from the light controller 54 to move the third housing 60, containing the light emitting elements 50 and the imaging devices 52, relative to the fuselage 26 of the rotorcraft 12. With reference to FIG. 2, the light system 24 is in a first, retracted position in which the second housing portion 66 of the third housing 60 is retracted within a surface 26a of the fuselage 26. In this position, the third housing 60 may be protected from an environment surrounding the rotorcraft 12. With reference to FIG. 3, the light system 24 is in a second, extended position in which the second housing portion 66 of the third housing 60 is positioned through an opening 26b (FIG. 4) defined in the fuselage 26 so as to extend below the surface 26a of the fuselage 26. In the second, extended position, the light emitting elements 50 may illuminate a region around or under the rotorcraft 12, and the imaging devices 52 may capture images of the region around or under the rotorcraft 12.

With reference back to FIG. 2, the actuator assembly 44 includes an electric motor 74, a gear train 76 and a failsafe brake 78. The electric motor 74 is in communication with the light controller 54 and the power source 42 to receive current from the power source 42. In this example, the electric motor 74 is a direct current (DC) motor. In one example, with reference to FIGS. 2A-2B, an exemplary gear train 76 for use with the electric motor 74 and the light system 24 is shown. In this example, the electric motor 74 includes an output shaft 75 having a gear 77. The gear 77 includes a post 77a, which is received within a slot 79a of a rod 79. The gear 77 is coupled or connected to the output shaft 75 such that the gear 77 rotates with and is driven by the output shaft 75. The post 77a couples the gear 77 to the rod 79. In one example, the rod 79 is fixedly coupled to the first housing portion 64 via welding, mechanical fasteners, etc. The slot 79a is defined through the rod laterally or horizontally so as to extend along an axis substantially parallel to an axis of the fuselage 26. As the output shaft 75 rotates or drives the gear 77, the post 77a translates in the slot 79a and moves the light system 24 between the first, retracted position (FIG. 2A) and the second, extended position (FIG. 2B).

Figure 2D:
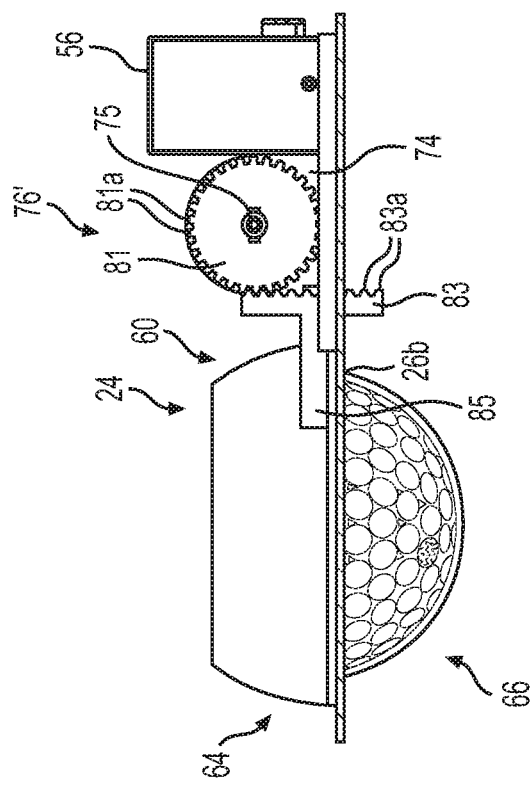
FIG. 2D is a rear side view of the light system of the search and landing light system of FIG. 1, in which the light system is in the second, extended position and an actuator system includes the second exemplary gear train.
Figure 2C:
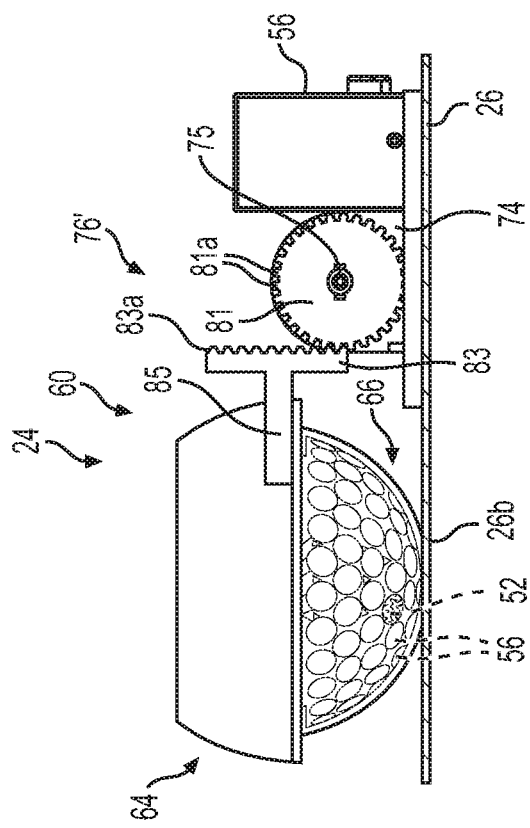
FIG. 2C is a rear side view of the light system of the search and landing light system of FIG. 1, in which the light system is in the first, retracted position and an actuator system includes a second exemplary gear train.

It should be noted that in other embodiments, the gear train 76 may be configured differently to move the light system 24 between the first, retracted position and the second, extended position. In one example, with reference to FIGS. 2C-2D, another exemplary gear train 76' is shown. In this example, the electric motor 74 includes the output shaft 75 having a gear 81. The gear 81 includes a plurality of gear teeth 81a defined about a perimeter or circumference of the gear 81. The gear 81 is coupled or connected to the output shaft 75 such that the gear 81 rotates with and is driven by the output shaft 75. The plurality of gear teeth 81a of the gear 81 meshingly engage with a plurality of gear teeth 83a of a rack 83. In one example, the rack 83 is supported on a shaft 85, and the shaft 85 is fixedly coupled to the first housing portion 64 via welding, mechanical fasteners, etc. The rack 83 is defined to extend along an axis that is substantially perpendicular to the opening 26b defined through the fuselage 26. As the output shaft 75 rotates or drives the gear 81, the plurality of gear teeth 81a engage with the plurality of gear teeth 83a of the rack 83 and move the light system 24 between the first, retracted position (FIG. 2C) and the second, extended position (FIG. 2D).

It should be noted that in other embodiments, the gear train 76 may have any other suitable arrangement to move the light system 24. For example, the gear train 76 may include a planetary gear train or other gear arrangement. Further, in certain embodiments, the gear train 76 increases the output torque of the electric motor 74.

The failsafe brake 78 is coupled to the output shaft 75 of the electric motor 74. In one example, the output shaft 75 of the electric motor 74 extends from a backside of the electric motor 74. The failsafe brake 78 inhibits the further rotation of the output shaft 75 in an instance where the electric motor 74 is inadvertently uncoupled from the power source 42. The failsafe brake 78 operates as a power-off brake that will prevent the rotation of the output shaft 75 during power-off, which may be intentional or unintentional. During normal power-on condition, the failsafe brake 78 is operated to disengage the output shaft 75 from the electric motor 74 to allow free rotation of the output shaft 75.

The actuator position sensor 46 observes a position of the actuator assembly 44 and generates sensors signals based thereon. The actuator position sensor 46 is in communication with the light controller 54, and transmits these sensor signals to the light controller 54, which determines whether the third housing 60 is in the first, retracted position or the second, extended position based on the sensor signals. It should be noted that alternatively, the actuator position sensor 46 may observe a rotation of the output shaft of the electric motor 74 and/or a position of the third housing 60 and generate sensor signals based on the observation, which is used by the light controller 54 to determine the position of the third housing 60. In one example, the actuator position sensor 46 includes, but is not limited to, an absolute encoder, Hall effect sensor, etc. In one example, the actuator position sensor 46 is disposed within the second housing 58, however, the actuator position sensor 46 may be positioned at any desired location to enable the light controller 54 to determine the position of the third housing 60 based on the sensor signals from the actuator position sensor 46.

The attitude and heading sensor 48 observes a pitch, roll and yaw of the rotorcraft 12, and generates sensor signals based on the observation. The attitude and heading sensor 48 is in communication with the light controller 54, and transmits these sensor signals to the light controller 54, which determines whether to change the activation of one or more of the light emitting elements 50, as will be discussed. In one example, the attitude and heading sensor 48 includes, but is not limited to, an attitude and heading reference system (AHRS), an inertial measurement unit (IMU), etc. In one example, the attitude and heading sensor 48 is coupled to a planar surface 80 disposed within the first housing portion 64 of the third housing 60. In this example, the planar surface 80 is defined along a portion of the second housing portion 66 so as to be proximate the first housing portion 64. In this example, the planar surface 80 is disposed behind a hemispherical surface 82 to which the light emitting elements 50 and the imaging devices 52 are coupled. It should be noted, that alternatively, the attitude and heading sensor 48 may be coupled to the base 68 of the first housing portion 64.

The system position sensor 49 observes global position of the light system 24, and generates sensor signals based on the observation. In one example, the system position sensor 49 includes, but is not limited to, a global position system (GPS), a global navigation satellite system (GNSS), one or more laser range finders, etc. The system position sensor 49 is in communication with the light controller 54, and transmits the global position of the light system 24 to the light controller 54. In one example, the system position sensor 49 is coupled to the planar surface 80 disposed within the first housing portion 64 of the third housing 60 (FIG. 2). It should be noted, that alternatively, the system position sensor 49 may be coupled to the base 68 of the first housing portion 64.

Figure 4:
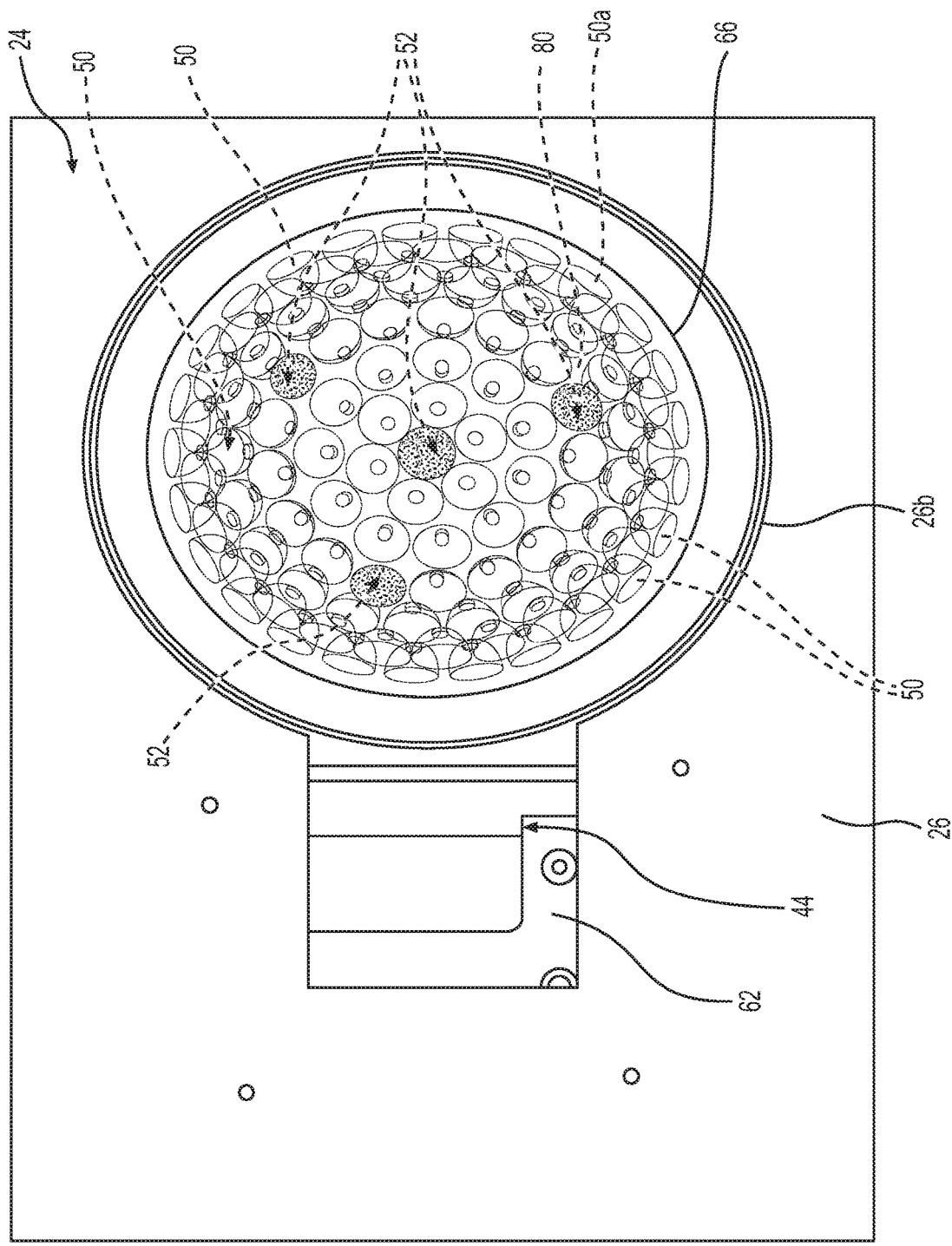
FIG. 4 is a bottom view of the light system of the search and landing light system of FIG. 1, in which the light system is in the second, extended position, in accordance with the various teachings of the present disclosure.

The light emitting elements 50 are coupled to the hemispherical surface 82, which is disposed within the second housing portion 66 of the third housing 60. The light emitting elements 50 are each in communication with the light controller 54 and the power source 42 to receive current to emit or output a light beam. As will be discussed, the light controller 54 determines which of the light emitting elements 50 to illuminate such that the light emitting elements 50 are selectively illuminated by the light controller 54. With reference to FIG. 4, the light emitting elements 50 are coupled to the hemispherical surface 82 so as to substantially cover an entirety of the hemispherical surface 82. The light emitting elements 50 include, but are not limited to, light emitting diodes (LEDs). In other embodiments, the light emitting elements 50 may comprise organic light-emitting diodes (OLEDs). As will be discussed, the light controller 54 determines which of the light emitting elements 50 to activate such that the selected light emitting elements 50 output a light beam at a desired orientation relative to the rotorcraft 12. The number of light emitting elements 50 disposed on the hemispherical surface 82 is calculated by:

$$J = \frac{2\pi r^2}{A} \qquad (1)$$

Wherein r is a radius of the hemispherical surface 82; J is the number of light emitting elements 50; and A is the area occupied by each one of the light emitting elements 50 on the hemispherical surface 82. In one example, the area A is about 0.5 square inches (in$^2$) to about 1.0 square inches (in$^2$), and the radius r is about 2.0 square inches (in$^2$) to about 4.0 square inches (in$^2$). The area A of a respective light emitting element 50 is a cross-sectional area of a case or dome 50$a$ that surrounds the respective light emitting element 50. Generally, the maximum number of light emitting elements 50 coupled to the hemispherical surface 82 is about 200 of the light emitting elements 50.

The imaging devices 52 are also coupled to the hemispherical surface 82. In one example, the light system 24 includes four imaging devices 52, but the light system 24 may include any number of imaging devices 52. The imaging devices 52 are generally coupled to the hemispherical surface 82 so as to be spaced apart about the hemispherical surface 82 to enable the generation of a panoramic image by the light controller 54. Each of the imaging devices 52 is in communication with the light controller 54, and transmits or communicates image data or an image data stream to the light controller 54. In one example, each of the imaging devices 52 is a camera capable of capturing image data or an image data stream, as known to those skilled in the art. In certain embodiments, one or more of the imaging devices 52 may comprise a color camera capable of capturing color images. In other embodiments, one or more of the imaging devices 52 may comprise an infrared camera to capture infrared images. In certain embodiments, one or more of the imaging devices 52 may include a grayscale camera to capture grayscale images. In certain embodiments, one or more of the imaging devices 52 may comprise a stereo camera assembly capable of capturing stereo images with depth information. For example, one or more of the imaging devices 52 may include a stereo camera with two or more lenses and image sensors arranged to capture stereoscopic images about the rotorcraft 12 with depth information. One or more of the imaging devices 52 may be long-range cameras for capturing images over an extended distance. Images may be captured by the imaging devices 52 according to various timings or other considerations. In certain embodiments, for example, the respective imaging devices 52 may capture images continuously as the rotorcraft 12 moves (based on the sensor signals from the attitude and heading sensor 48). In certain embodiments, the light controller 54 may cause the respective imaging devices 52 to capture images at regular time intervals as the rotorcraft 12 moves. It should be noted that while the imaging devices 52 are described herein as comprising cameras, the imaging devices 52 may comprise radars, lidars, optical cameras, thermal cameras, ultrasonic sensors, and combinations thereof.

With reference to FIG. 1, the light controller 54 includes at least one processor 90 and a computer readable storage device or media 92. The processor 90 can be any custom made or commercially available processor, a central processing unit (CPU), a graphics processing unit (GPU), an auxiliary processor among several processors associated with the light controller 54, a semiconductor based microprocessor (in the form of a microchip or chip set), a macroprocessor, any combination thereof, or generally any device for executing instructions. The computer readable storage device or media 92 may include volatile and non-volatile storage in read-only memory (ROM), random-access memory (RAM), and keep-alive memory (KAM), for example. KAM is a persistent or non-volatile memory that may be used to store various operating variables while the processor 90 is powered down. The computer-readable storage device or media 92 may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the light controller 54 in controlling components associated with the light system 24.

The instructions may include one or more separate programs, each of which comprises an ordered listing of executable instructions for implementing logical functions. The instructions, when executed by the processor 90, receive and process input signals, perform logic, calculations, methods and/or algorithms for controlling the components of the light system 24, and generate control signals to components of the light system 24 to control light output by the light emitting elements 50 based on the logic, calculations, methods, and/or algorithms. Although only one light controller 54 is shown in FIG. 1, embodiments of the light system 24 can include any number of controllers 54 that communicate over any suitable communication medium or a combination of communication mediums and that cooperate to process the signals from the actuator position sensor 46, process signals from the attitude and heading sensor 48, process signals from the system position sensor 49, perform logic, calculations, methods, and/or algorithms, and generate control signals to control the light emitting elements 50 of the light system 24.

In various embodiments, one or more instructions of the light controller 54 are associated with the light system 24 and, when executed by the processor 90, the instructions receive and process signals from the controller 20 to determine which light emitting elements 50 to illuminate. In various embodiments, one or more instructions of the light controller 54 are associated with the light system 24 and, when executed by the processor 90, the instructions receive and process signals from the imaging devices 52 to determine which light emitting elements 50 to activate, and communicate image data to the controller 20 via the light communication device 40.

Figure 5:
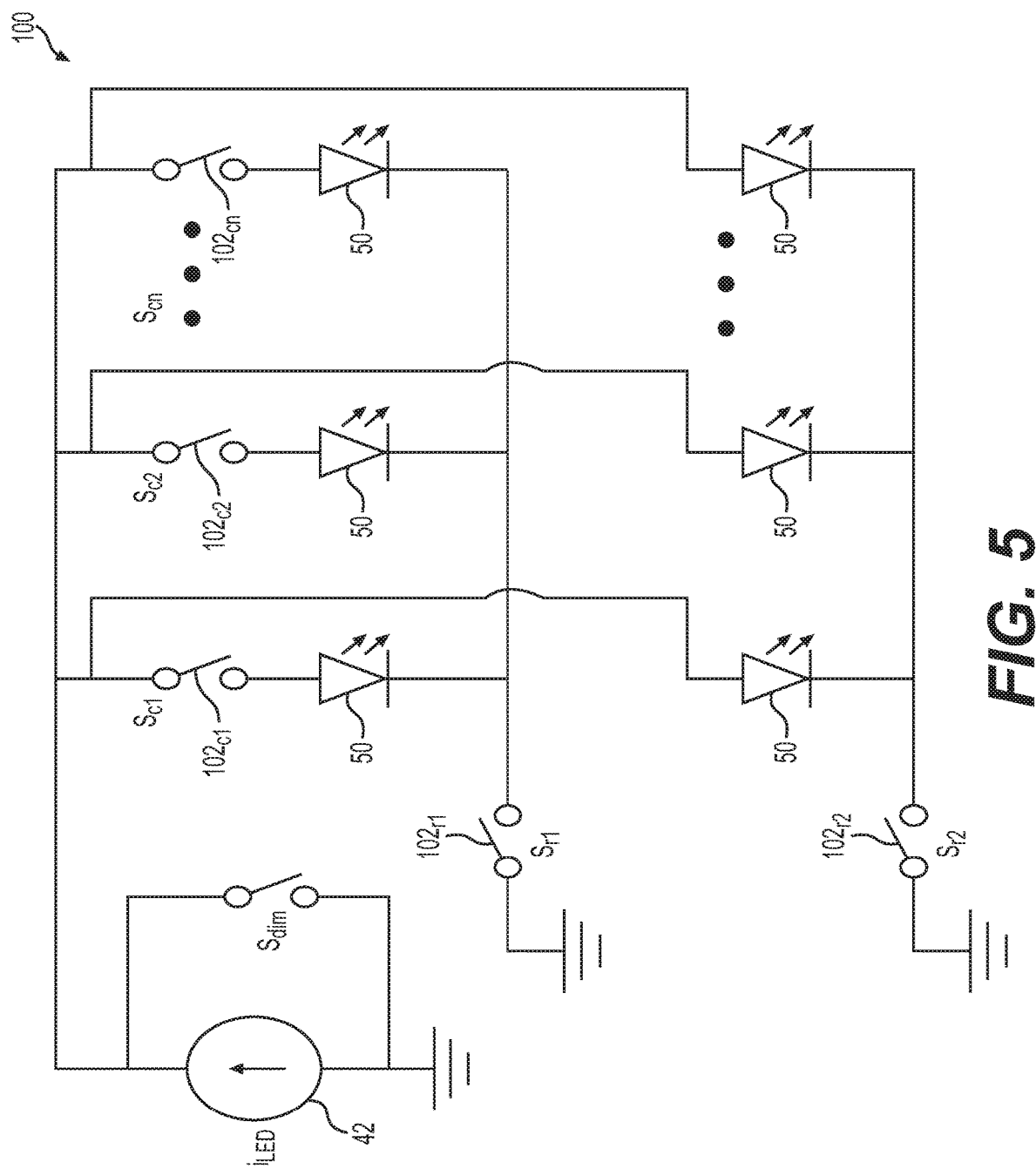
FIG. 5 is a circuit diagram illustrating a switch matrix circuit for the light system of the search and landing light system of FIG. 1 in accordance with the various teachings of the present disclosure.
Figure 7:
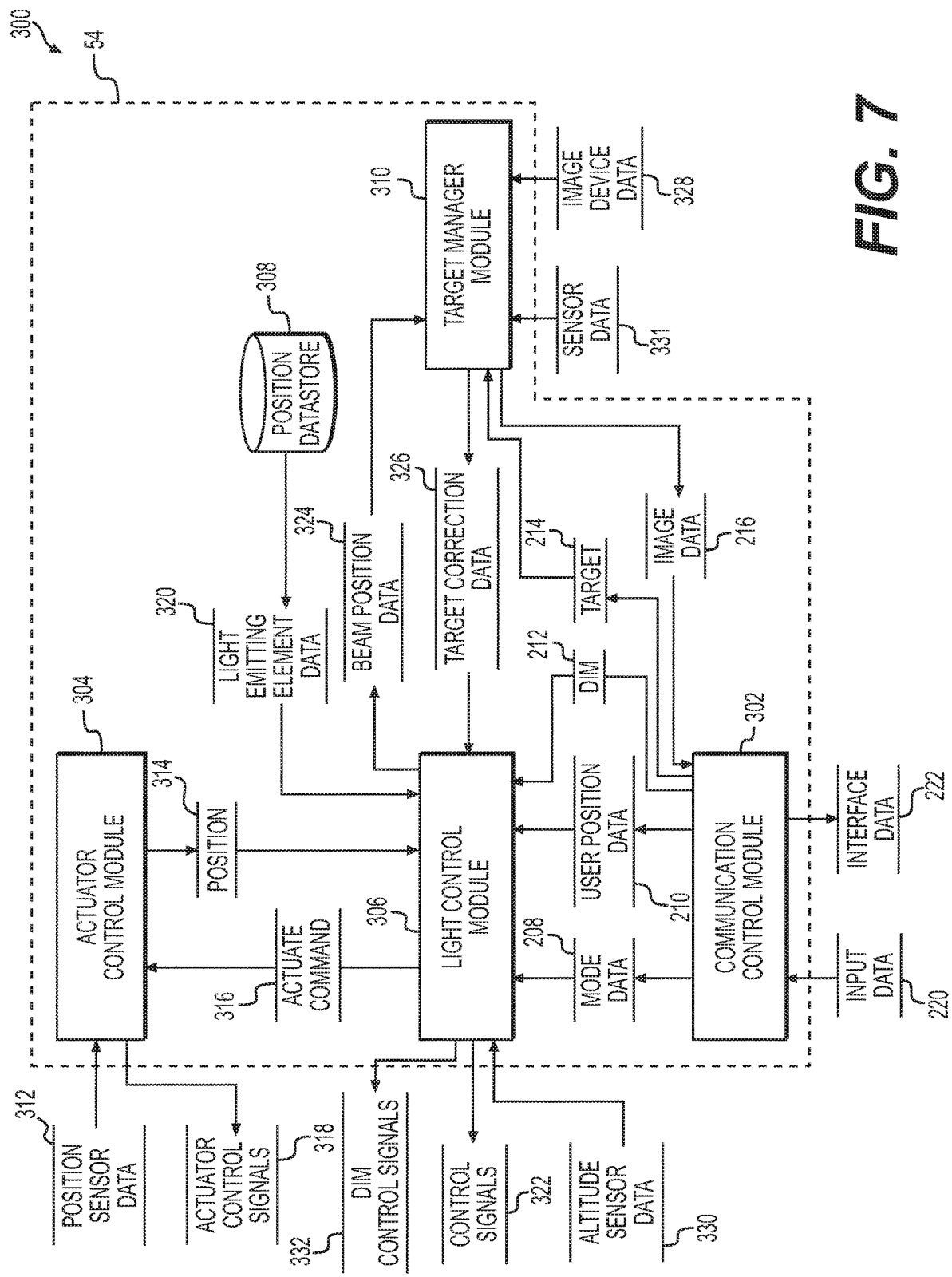
FIG. 7 is a dataflow diagram illustrating a lighting control system of the search and landing light system of FIG. 1, in accordance with various embodiments.

In one example, with reference to FIG. 5, one or more instructions of the light controller 54 are associated with the light system 24, and when executed by the processor 90, the instructions open or close one or more switches 102 associated with the light emitting elements 50 to control the light output by the respective light emitting elements 50. In the example of FIG. 7, a switch matrix circuit 100 is shown. The switch matrix circuit 100 includes m number of switches 102c arranged in rows and n number of switches 102r arranged in columns, which is based on the number of light emitting elements 50. In one example, the switch matrix circuit 100 is configured based on the following equation:

$$J = m \times n \qquad (2)$$

Wherein J is the number of light emitting elements 50 from equation (1); m is the number of switches 102r arranged in rows; and n is the number of switches 102c arranged in columns. In one example, m is about 30 to about 100; and n is at least 2. In the example of FIG. 7, m is two (102r1, 102r2) and n number of switches 102c1-102cn are shown in columns. It should be noted that in other embodiments, each light emitting element 50 may also be realized with series combination of multiple light emitting elements 50. In this example, the light controller 54 may dim the light emitting elements 50 by pulsating the current through the light emitting elements 50 with adjustable duty ratio of $S_{dim}$.

Figure 6:
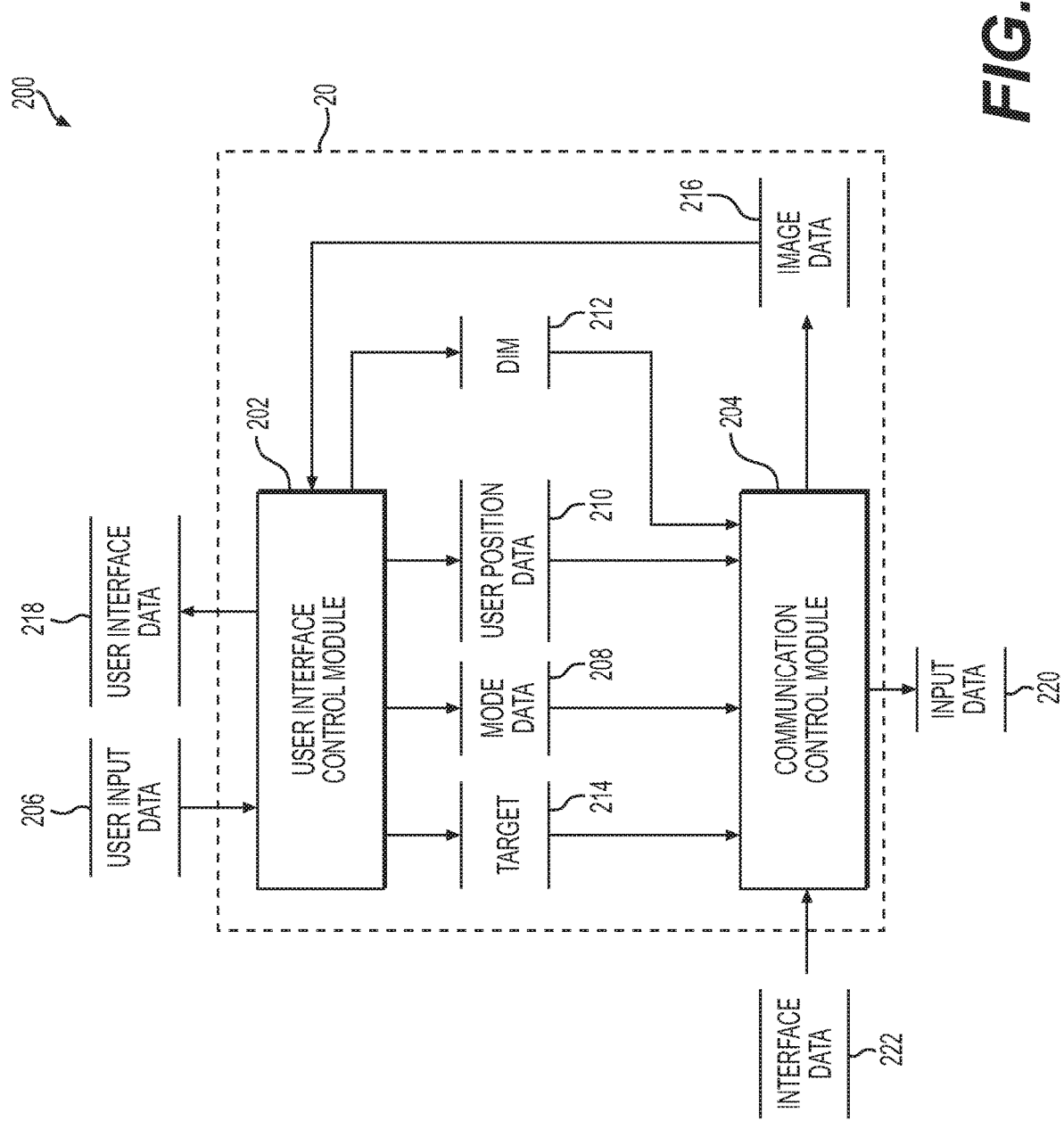
FIG. 6 is a dataflow diagram illustrating a control system of the search and landing light system of FIG. 1, in accordance with various embodiments.

With reference to FIG. 6, and with continued reference to FIGS. 1-5, a dataflow diagram illustrates various embodiments of a control system 200 of the search and landing light system 10, which may be embedded within the controller 20. Various embodiments of the control system 200 according to the present disclosure can include any number of sub-modules embedded within the controller 20. As can be appreciated, the sub-modules shown in FIG. 6 may be combined and/or further partitioned to similarly receive data from the human-machine interface 16, and to output data to the light controller 54. Inputs to the control system 200 may be received from the human-machine interface 16 (FIG. 1), received from other control modules (not shown) associated with the search and landing light system 10, and/or determined/modeled by other sub-modules (not shown) within the controller 20. In various embodiments, the control system 200 includes a user interface (UI) control module 202 and a communication control module 204.

The UI control module 202 receives user input data 206. The user input data 206 is received from a user's interaction with the human-machine interface 16. The UI control module 202 processes the user's interaction with the human-machine interface 16, and determines a user selected mode or mode data 208 for the operation of the light system 24. In one example, the UI control module 202 processes the user input data 206 to determine whether the user has selected one of a true slew mode, a normal slew mode, a user-defined slew mode, a home mode and an object tracking mode. The true slew mode is an operational mode for the light system 24 in which the light emitting elements 50 are controlled by the light controller 54 to output a light beam along a straight line. The normal slew mode is an operational mode for the light system 24 in which the light emitting elements 50 are controlled by the light controller 54 to output a light beam around an arc. The user-defined slew mode is an operational mode for the light system 24 in which the light emitting elements 50 are controlled by the light controller 54 based on a position received from the user's interaction with the human-machine interface 16. The home mode is an operational mode for the light system 24 in which the light emitting elements 50 are controlled by the light controller 54 to output a light beam at a fixed orientation relative to the rotorcraft 12. The home mode may be used as a landing light for the rotorcraft 12, for example. The object tracking mode is an operational mode for the light system 24 in which the light emitting elements 50 are controlled by the light controller 54 to track an object. The UI control module 202 sets the received operational mode for the light system 24 as the mode data 208 for the communication control module 204. The mode data 208 comprises one of the operational modes for the light system 24 such as the true slew mode, the normal slew mode, the user-defined slew mode, the home mode and the object tracking mode.

Based on the selection of the user-defined slew mode, the UI control module 202 also processes the user input data 206 to determine the user's selected position for a light beam from the light system 24. For example, the user's selected position may be received as an input from a joystick associated with the human-machine interface 16 that is manipulated by the user. The UI control module 202 processes the user's interaction with the human-machine interface 16, and determines user position data 210 for the communication control module 204. The user position data 210 is the user's selected position for a light beam to be output by the light system 24, and may include a pitch angle, a yaw angle and a roll angle for the location of the light beam output by the light system 24.

The UI control module 202 also processes the user input data 206, and determines whether the user has requested to dim the operation of the light system 24. If true, the UI control module 202 sets dim 212 for the communication control module 204. The dim 212 is a command to reduce an intensity of the light beam output by the light system 24.

Based on the selection of the object tracking mode, the UI control module 202 processes the user input data 206 and determines whether the user has selected a target for tracking. If true, the UI control module 202 sets target 214 for the communication control module 204. The target 214 is an object that is desired to be tracked by a light beam output by the light system 24. The target 214 may be selected by the operator (via the human-machine interface 16) as the object that the light system 24 is directed at or pointing at, which may be identified by the operator via the image data 216 from the imaging devices 52. Generally, as will be discussed, as the rotorcraft 12 moves, the control system 200 computes the required orientation change and continues to point the light system 24 at the desired target 214. In one example, as will be discussed, the control system 200 computes the required orientation change based on the image data 216 from the imaging devices 52.

The UI control module 202 also receives as input the image data 216. The image data 216 is the image data stream from the imaging devices 52, which are communicated via the light communication device 40 to the communication device 18 of the controller 20. The UI control module 202 processes the image data 216 and generates a panoramic image from the image data streams of each of the imaging devices 52. For example, the UI control module 202 stitches the image data stream from each of the imaging devices 52 along boundaries of the images in the image data stream to generate a 360 degree panoramic view. The UI control module 202 generates and outputs user interface data 218 for rendering the panoramic image data on the display 30 of the human-machine interface 16. The user interface data 218 may also include one or more selectable icons or buttons along a periphery of the panoramic image to enable the user to select the mode for the operation of the light system 24.

The communication control module 204 receives as input the mode data 208, the user position data 210, the dim 212 and the target 214. The communication control module 204 outputs the mode data 208, the user position data 210, the dim 212 and the target 214 as input data 220 for transmission by the communication device 18 to the light controller 54. The communication control module 204 also receives as input interface data 222. The interface data 222 is the image data stream or image data from the imaging devices 52. Based on the receipt of the interface data 222, the communication control module 204 sets the image data 216 for the UI control module 202.

With reference to FIG. 7, and with continued reference to FIGS. 1-6, a dataflow diagram illustrates various embodiments of a lighting control system 300 of the search and landing light system 10, which may be embedded within the light controller 54. Various embodiments of the lighting control system 300 according to the present disclosure can include any number of sub-modules embedded within the light controller 54. As can be appreciated, the sub-modules shown in FIG. 7 may be combined and/or further partitioned to similarly receive data from the controller 20, and to output one or more control signals to the switches 102 (FIG. 5) to illuminate the light emitting elements 50. Inputs to the lighting control system 300 may be received from the human-machine interface 16 (FIG. 1), received from the actuator position sensor 46 (FIG. 1), received from the attitude and heading sensor 48 (FIG. 1), received from the system position sensor 49 (FIG. 1), received from the imaging devices 52 (FIG. 1), received from other control modules (not shown) associated with the search and landing light system 10, and/or determined/modeled by other sub-modules (not shown) within the light controller 54. In various embodiments, the lighting control system 300 includes a communication control module 302, an actuator control module 304, a light control module 306, a position datastore 308 and a target manager module 310. Initially, it should be noted that the actuator control module 304 may be optional, as the light system 24 may be fixed in its position relative to the rotorcraft 12 or unmovable relative to the rotorcraft 12, if desired.

The communication control module 302 receives as input the input data 220 from the communication control module 204 of the controller 20. Based on the receipt of the input data 220, the communication control module 302 processes the input data 220 and sets the mode data 208 for the light control module 306. The communication control module 302 processes the input data 220 and sets the dim 212, if applicable, for the light control module 306. The communication control module 302 also processes the input data 220 and sets the user position data 210, if applicable, for the light control module 306. The communication control module 302 processes the input data 220 and sets the target 214, if applicable, for the target manager module 310.

The communication control module 302 receives as input the image data 216 from the target manager module 310. As discussed, the image data 216 is the image data stream or image data from the imaging devices 52. The communication control module 302 outputs the image data 216 as the interface data 222 for the communication control module 204 of the controller 20.

The actuator control module 304 receives as input position sensor data 312. The position sensor data 312 is the sensor signals or sensor data from the actuator position sensor 46. The actuator control module 304 processes the position sensor data 312, and determines, based on the position sensor data 312, whether the light system 24 is in the first, retracted position or the second, extended position. The actuator control module 304 sets the determined position of the light system 24 as the position 314 for the light control module 306. The position 314 indicates whether the light system 24 is in the first, retracted position or the second, extended position.

The actuator control module 304 also receives as input actuate command 316 from the light control module 306. The actuate command 316 is a command to move the light system 24 from the first, extended position to the second, retracted position or vice versa, depending upon the position 314 of the light system 24. Based on the receipt of the actuate command 316, the actuator control module 304 generates and outputs one or more actuator control signals 318 to the actuator assembly 44 to control the actuator assembly 44 to move the light system 24. In one example, the actuator control module 304 outputs one or more control signals that supply current to the electric motor 74 to drive the gear train 76, 76' to move the light system 24 between the first, retracted position and the second, extended position. Generally, based on the actuate command 316, the actuator control module 304 outputs the actuator control signals 318 to move the light system 24 from its current position to the position opposite the current position (first position to second position; second position to first position).

The position datastore 308 stores data of a local coordinate for each of the light emitting elements 50 and a switching number for the switch 102 associated with the light emitting element 50. In one example, the position datastore 308 stores a table that correlates a local coordinate of a light beam output by a light emitting element 50 to a switching element number associated with one of the switches 102 such that an activation of a particular one of the switches 102 results in the illumination of the light emitting element 50 to output a light beam covering or illuminating a selected area. Thus, the position datastore 308 stores one or more lookup tables, which provide light emitting element data 320 that corresponds with the desired switch 102 to close to activate the light emitting element 50 to provide the light beam at the selected location. Generally, each light emitting element 50 is pre-assigned a local coordinate based on an pitch angle, yaw angle and roll angle associated with the hemispherical surface 82, and each light emitting element 50 is identified by the controller 54 based on its particular local coordinate. For example a coordinate location of (0, 0, 0) indicates that the light emitting element 50 is faces a nose of the rotorcraft 12 (pitch angle is 0 degrees), is pointed in the vertical direction (yaw is 0 degrees) and is not banked relative to the rotorcraft 12 (roll angle is 0 degrees). The local coordinate locations for each light emitting element 50 and the switching number of the switch 102 associated with each light emitting element 50 are predefined, or factory set values. Thus, the light emitting element data 320 provides the switching element number for the switch 102 to be activated to illuminate the light emitting element 50 to provide the desired light beam output at a particular coordinate location. In addition, the position datastore 308 stores data that indicates which of the switches 102 to activate in the true slew mode, the normal slew mode and the home mode. The light emitting element data 320 associated with each of the true slew mode, the normal slew mode and the home mode is predefined, or a factory set value.

The light control module 306 receives as input the mode data 208 from the communication control mode 302. Based on the receipt of the mode data 208, the light control module 306 receives the position 314 from the actuator control module 304 and determines a position of the light system 24. If the position 314 indicates that the light system 24 is in the first, retracted position, the light control module 306 sets the actuate command 316 for the actuator control module 304 to move the light system 24 to the second, extended position.

Based on the mode data 208 as the true slew mode, the light control module 306 queries the position datastore 308 and retrieves the light emitting element data 320 associated with the true slew mode or the output of the light beam in a straight line relative to the rotorcraft 12. Based on the light emitting element data 320, the light control module 306 generates and outputs one or more control signals 322 to the switches 102 in the light emitting element data 320 associated with the true slew mode. The control signals 322 comprise one or more control signals to the switches 102 associated with the particular light emitting elements 50 to activate the particular light emitting elements 50 to output a light beam. In one example, the control signals 322 comprise one or more control signals to close the switch 102 retrieved in the light emitting element data 320 to supply current to the associated light emitting element 50 to output the light beam.

Based on the mode data 208 as the normal slew mode, the light control module 306 queries the position datastore 308 and retrieves the light emitting element data 320 associated with the normal slew mode or the output of the light beam around an arc relative to the rotorcraft 12. Based on the light emitting element data 320, the light control module 306 generates and outputs the one or more control signals 322 to the switches 102 in the light emitting element data 320 associated with the normal slew mode.

Based on the mode data 208 as the user-defined slew mode, the light control module 306 receives as input the user position data 210. Based on the user position data 210, which indicates the desired position for the output of the light beam by the light system 24, the light control module 306 queries the position datastore 308 and retrieves the light emitting element data 320 associated with the user's selected position for the light beam from the user position data 210. In this regard, based on the user's selected position, the light control module 306 queries the position datastore 308 and retrieves the light emitting element data 320 to activate the light emitting elements 50 at the coordinate location selected by the user. Based on the light emitting element data 320, the light control module 306 generates and outputs the one or more control signals 322 to the switches 102 in the light emitting element data 320 associated with the user-defined slew mode.

Based on the mode data 208 as the home mode, the light control module 306 queries the position datastore 308 and retrieves the light emitting element data 320 associated with the home mode or the output of the light beam at a fixed orientation relative to the rotorcraft 12. Based on the light emitting element data 320, the light control module 306 generates and outputs the one or more control signals 322 to the switches 102 in the light emitting element data 320 associated with the home mode.

Based on the mode data 208 as the object tracking mode, the light control module 306 receives as input attitude sensor data 330. The attitude sensor data 330 is the sensor signals or sensor data from the attitude and heading sensor 48. The light control module 306 processes the attitude sensor data 330 and determines a current position or current pitch, roll and yaw of the rotorcraft 12. Based on the current position of the rotorcraft 12, and the light emitting elements 50 activated, the light control module 306 sets beam position data 324 for the target manager module 310. The beam position data 324 is a current location of the light beam output by the light system 24 on a ground surface. The light control module 306 receives target correction data 326 from the target manager module 310. The target correction data 326 is an amount of correction for a location of the light beam output by the light system 24. Based on the target correction data 326, the light control module 306 queries the position datastore 308 and retrieves the light emitting element data 320 associated with the corrected location such that the light beam output by the retrieved light emitting elements illuminates the target location. Based on the light emitting element data 320, the light control module 306 generates and outputs the one or more control signals 322 to switches 102 in the light emitting element data 320 to illuminate the target for tracking a location of the target relative to the rotorcraft 12.

The light control module 306 also receives as input the dim 212. Based on the dim 212, the light control module 306 generates and outputs the one or more dim control signals 332 for the power source 42 to reduce a current supplied to the light emitting elements 50. In one example, the dim control signals 332 comprise one or more control signals to supply current to the retrieved light emitting elements 50 in the light emitting element data 320 with the adjustable duty ratio.

The target manager module 310 receives as input image device data 328. The image device data 328 is an image data stream or image data from the imaging devices 52. Based on the image device data 328, the target manager module 310 sets the image data 216 for the communication control module 302. The target manager module 310 receives as input the target 214. Based on the target 214, the target manager module 310 receives the beam position data 324 as input. The target manager module 310 sets the beam position data 324, which is the current location of the light beam output by the light system 24 that contains the target, as a target light beam position. The target light beam position is an initial position for a light beam output by the light system 24 that contains the user selected target. The target manager module 310 re-samples the image device data 328 at a pre-defined sampling rate and determines, using imaging processing and inverse kinematics based algorithms, whether a current location or target position for the light beam output by the light system 24 is different than the target light beam position. Based on a determination that the current location or target position for the light beam is different than the target light beam position, the target manager module 310 determines based on a comparison between the current location or target position and the target light beam position, an amount of correction for the position of the light beam. The target manager module 310 sets the amount of correction for the location of the light beam output by the light system 24 as the target correction data 326 for the light control module 306.

In other embodiments, the target manager module 310 may also receive as input sensor data 331. The sensor data 331 is the sensor signals or sensor data from the system position sensor 49. The target manager module 310 processes the sensor data 331 and determines a current position of the light system 24. In this embodiment, based on the receipt of the beam position data 324, the target manager module 310 receives as input the sensor data 331. The target manager module 310 monitors the sensor data 331, by sampling at a pre-defined sampling rate for example, and determines whether the initial position of the light system 24 from the initial sensor data 331 (received based on the receipt of the beam position data 324) has changed relative to a current position of the light system 24 received in the later sampled sensor data 331. If true, the target manager module 310 determines the amount of correction for the position of the light beam based on the difference between the initial position of the light system 24 and the current position of the light system 24, and sets this as the target correction data 326 for the light control module 306.

Referring now to FIGS. 8-12, and with continued reference to FIGS. 1-6, a flowchart illustrates a control method 400 that can be performed by the search and landing light system 10 in accordance with the present disclosure. In various embodiments, the control method 400 is performed by the processor 32 of the controller 20 and the processor 90 of the light controller 54. As can be appreciated in light of the disclosure, the order of operation within the method is not limited to the sequential execution as illustrated in FIGS. 8-12, but may be performed in one or more varying orders as applicable and in accordance with the present disclosure. In various embodiments, the control method 400 can be scheduled to run based on one or more predetermined events, such as based on the receipt of the input data 206.

Figure 8:
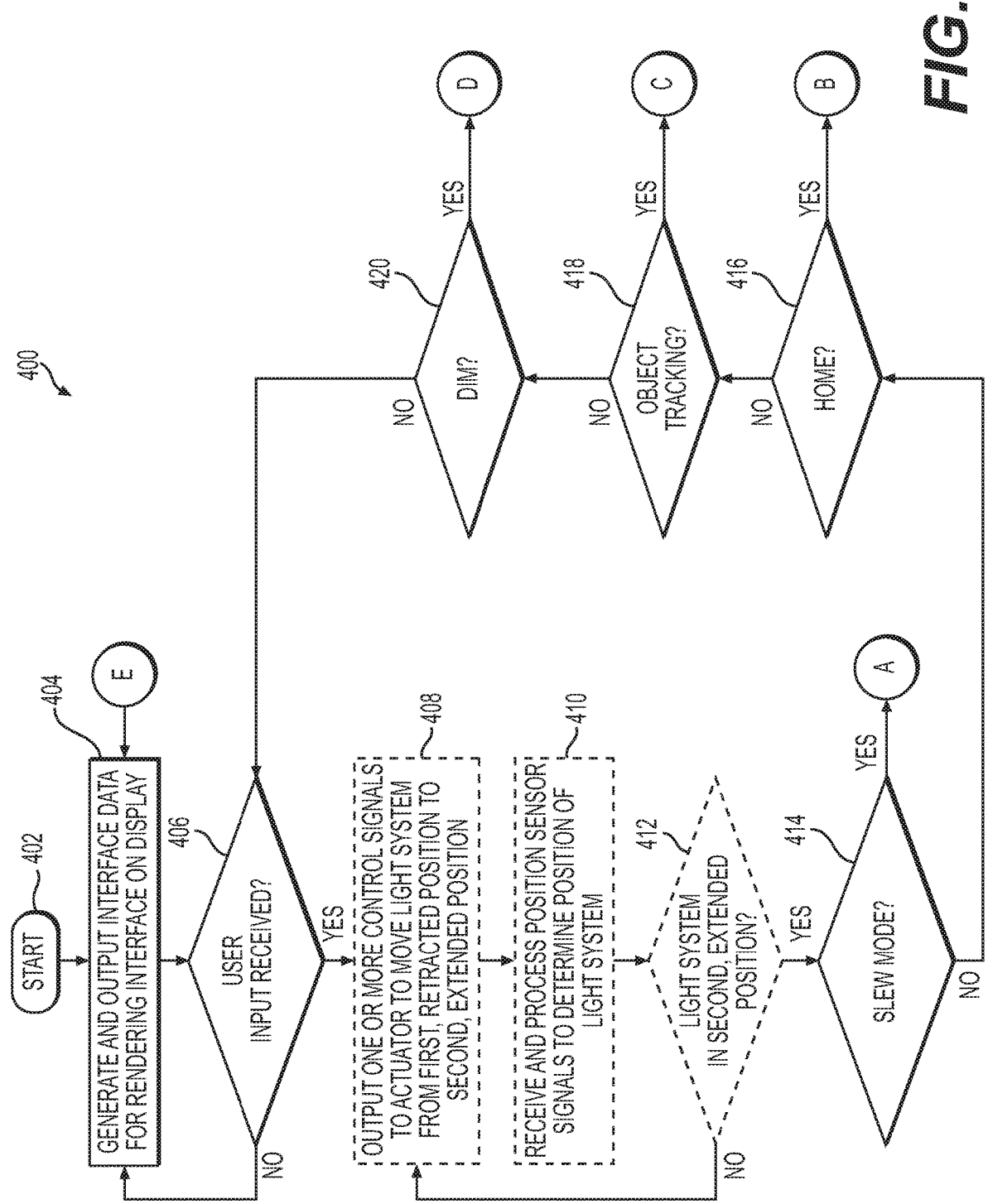
FIG. 8 is a flowchart illustrating a control method for the search and landing light system of FIG. 1, in accordance with various embodiments.

With reference to FIG. 8, the method begins at 402. At 404, the method generates and outputs user interface data 218 for rendering the user interface on the display 30 of the human-machine interface 16. As discussed, the user interface enables the user to select one or more modes for the operation of the light system 24, enables the user to view the image data stream from the imaging devices 52 and enables the user to select a target to track. At 406, the method determines whether user input data 206 has been received, via the user's interaction with the human-machine interface 16. If false, the method loops to 404.

If true, at 408, optionally, the method outputs one or more control signals to the actuator assembly 44 to move the light system 24 from the first, retracted position to the second, extended position. At 408, optionally, the method receives and processes the position sensor data 312 and determines a position of the light system 24. At 410, optionally, the method determines whether the light system 24 is in the second, extended position based on the position sensor data 312. If true, the method proceeds to 414. Otherwise, the method loops to 408. It should be noted that blocks 408-412 are optional in that the light system 24 need not be movable relative to the rotorcraft 12, but in certain instances, the third housing 60 may be fixedly coupled to the fuselage 26.

At 414, the method determines whether the user input data 206 includes a selection of one of the slew modes (the true slew mode, the normal slew mode or the user-defined slew mode). If true, the method proceeds to A on FIG. 9. Otherwise, at 416, the method determines whether the user input data 206 includes a selection of the home mode. If true, the method proceeds to B on FIG. 10. Otherwise, at 418, the method determines whether the user input data 206 includes a selection of object tracking. If true, the method proceeds to C on FIG. 11. Otherwise, at 420, the method determines whether the user input data 206 includes a selection of dim. If true, the method proceeds to D on FIG. 12. Otherwise, the method loops to 406. In one example, the method may output one or more control signals to the actuator assembly 44 to move the light system 24 from the second, extended position to the first, retracted position based on a shutdown request for an engine of the rotorcraft 12.

Figure 9:
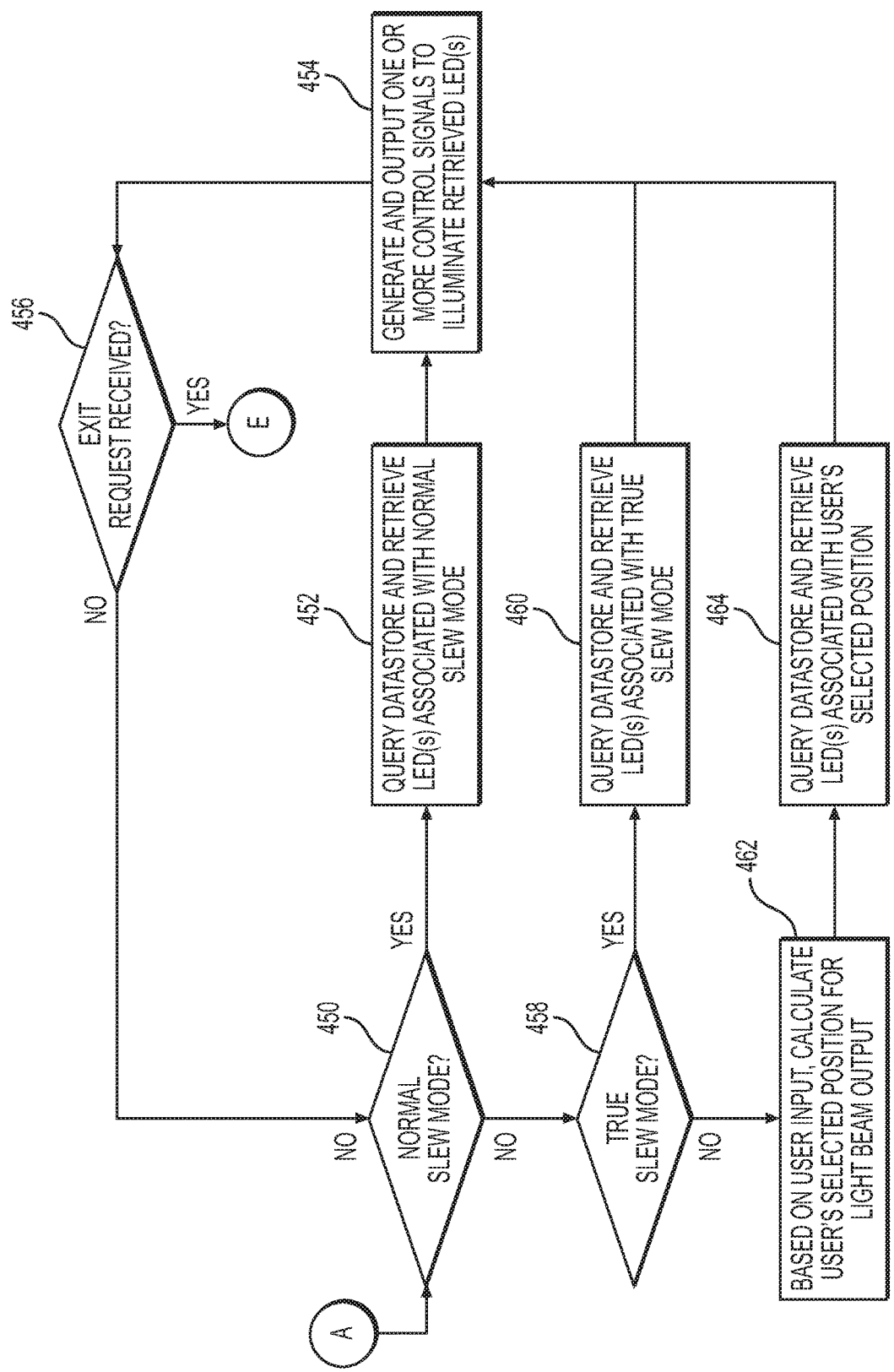
FIG. 9 is a continuation of the flowchart of FIG. 8.

With reference to FIG. 9, from A, at 450, the method determines, based on the user input data 206, if the user selected normal slew mode. If true, at 452, the method queries the position datastore 308 and retrieves the light emitting element data 320 associated with the normal slew mode. At 454, the method generates and outputs the one or more control signals 322 to close the switch(es) 102 retrieved in the light emitting element data 320 to supply current to the associated light emitting element(s) 50 to output the light beam associated with the normal slew mode. At 456, the method determines whether a request to exit the selected one of the slew modes has been received, via additional user input data 206, for example. In one example, the request to exit may be selected via a selectable icon or button displayed on the user interface rendered on the display 30. If true, the method proceeds to E on FIG. 8. Otherwise, the method loops to 450.

If the user has not selected the normal slew mode, at 458, the method determines based on the user input data 206, if the user selected true slew mode. If true, at 460, the method queries the position datastore 308 and retrieves the light emitting element data 320 associated with the true slew mode. The method proceeds to 456 and generates and outputs the one or more control signals 322 to close the switch(es) 102 retrieved in the light emitting element data 320 to supply current to the associated light emitting element(s) 50 to output the light beam associated with the true slew mode.

If the user has not selected the true slew mode, at 462, the method determines that the user-defined slew mode is selected and determines, based on the user input data 206, the user position data 210. At 464, the method queries the position datastore 308 and retrieves the light emitting element data 320 associated with the user position data 210. The method proceeds to 456 and generates and outputs the one or more control signals 322 to close the switch 102 retrieved in the light emitting element data 320 to supply current to the associated light emitting element 50 to output the light beam associated with the user position data 210 for the user-defined slew mode.

Figure 10:
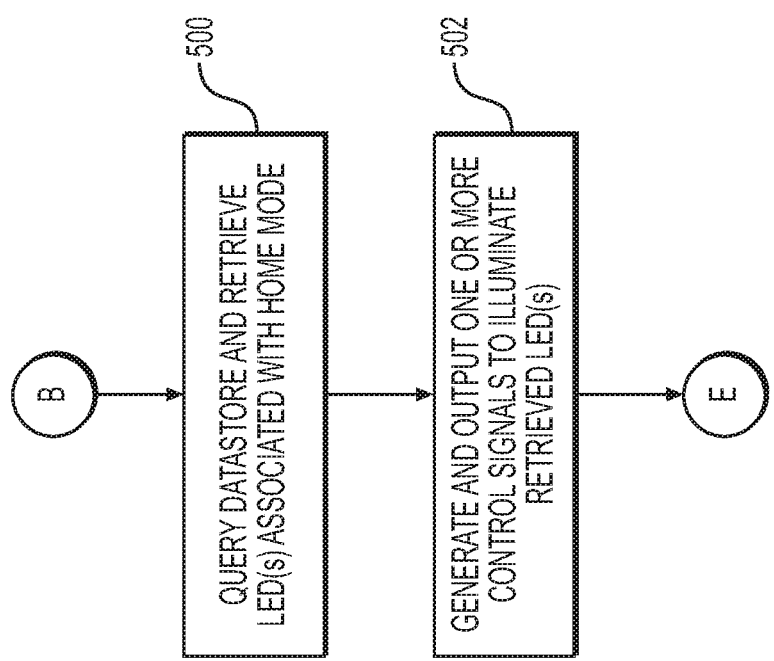
FIG. 10 is a continuation of the flowchart of FIG. 8.

With reference to FIG. 10, from B, at 500, the method queries the position datastore 308 and retrieves the light emitting element data 320 associated with the home mode. At 502, the method generates and outputs the one or more control signals 322 to close the switch 102 retrieved in the light emitting element data 320 to supply current to the associated light emitting element 50 to output the light beam associated with the home mode. The method proceeds to E on FIG. 8.

Figure 11:
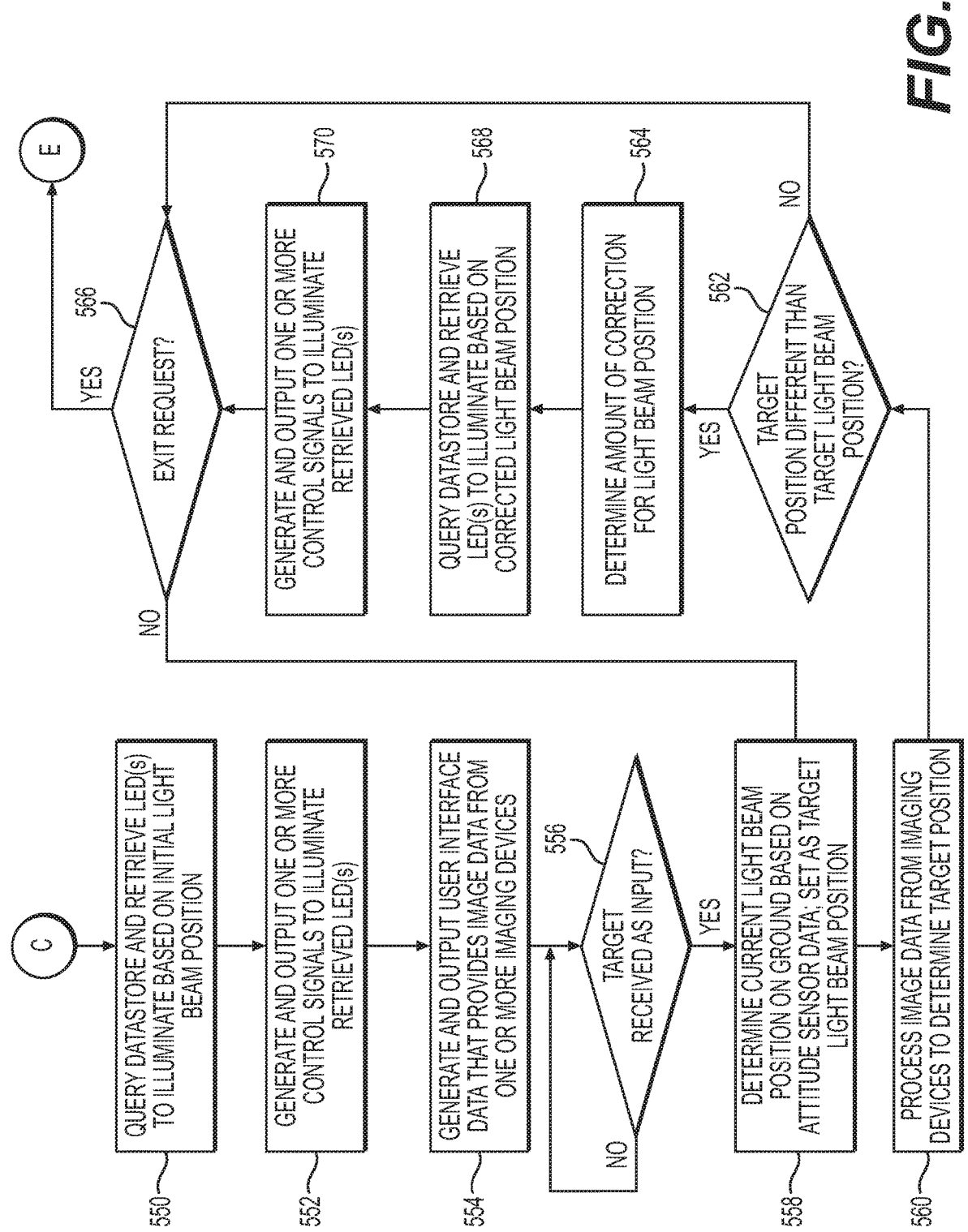
FIG. 11 is a continuation of the flowchart of FIG. 8.

With reference to FIG. 11, from C, at 550, the method queries the position datastore 308 and retrieves the light emitting element data 320 associated with an initial position for the light beam output by the light system 24. At 552, the method generates and outputs the one or more control signals 322 to close the switch(es) 102 retrieved in the light emitting element data 320 to supply current to the associated light emitting element(s) 50 to output the light beam. At 554, the method receives the image device data 328 from the imaging devices 52, and processes the image data 216 to generate a panoramic image. The method generates and outputs the user interface data 218 for rendering the panoramic image with the user interface on the display 30. At 556, the method determines whether the target 214 has been received as input, via user input data 206 to the human-machine interface 16. If true, the method proceeds to 558. Otherwise, the method loops.

At 558, the method determines the current location of the light beam output by the light system 24 (i.e. the beam position data 324) based on the attitude sensor data 330. The method sets the current location of the light beam as the target light beam position. At 560, the method re-samples the image device data 328 from the imaging devices 52 and determines the target position. At 562, the method determines whether the target position is different than the target light beam position. If true, the method proceeds to 564. Otherwise, at 566, the method determines whether a request to exit the selected one of the slew modes has been received, via additional user input data 206, for example. In one example, the request to exit may be selected via a selectable icon or button displayed on the user interface rendered on the display 30. If true, the method proceeds to E on FIG. 8. Otherwise, the method loops to 558.

At 564, the method determines the amount of correction for the light beam position. At 568, the method queries the position datastore 308 and retrieves the light emitting element data 320 based on the amount of correction for the light beam position. At 570, the method generates and outputs the one or more control signals 322 to close the switch(es) 102 retrieved in the light emitting element data 320 to supply current to the associated light emitting element(s) 50 to output the corrected light beam.

Figure 12:
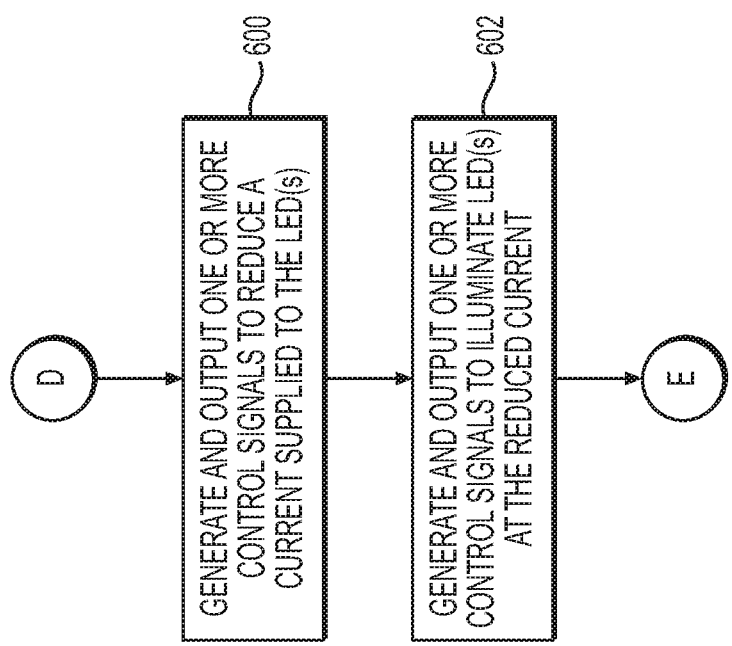
FIG. 12 is a continuation of the flowchart of FIG. 8.

With reference to FIG. 12, from D, at 600, the method generates and outputs the dim control signals 332 to reduce the current supplied to the light emitting elements 50 by the power source 42. At 602, the method generates and outputs the one or more control signals 322 to illuminate the light emitting elements at the reduced current. The method proceeds to E on FIG. 8.

In one example, with reference to FIG. 2, with the hemispherical surface 82 formed, the light emitting elements 50 and the imaging devices 52 are coupled to the hemispherical surface 82. The attitude and heading sensor 48 and the system position sensor 49 are each coupled to the planar surface 80. With the first housing portion 64 and the second housing portion 66 formed, the hemispherical surface 82 and the planar surface 80 are positioned within the first housing portion 64 and the second housing portion 66. The first housing portion 64 is coupled to the second housing portion 66 to enclose the attitude and heading sensor 48, the system position sensor 49, the light emitting elements 50 and the imaging devices 52 within the third housing 60. The first housing 56, with the light communication device 40, the power source 42 and the light controller 54 enclosed within the first housing 56, is coupled to the base plate 62. With the electric motor 74 coupled to the gear train 76 or gear train 76'; and the gear train 76 or gear train 76' coupled to the first housing portion 64. The second housing 58 is disposed over the electric motor 74 and the gear train 76, and is coupled to the base plate 62. The actuator position sensor 46 is disposed within the second housing 58 to observe a position of the actuator assembly 44. The base plate 62 is coupled to the fuselage 26 so as to be contained within the fuselage 26 and such that the third housing 60 is positionable by the actuator assembly 44 through the opening 26b defined in the fuselage 26. The light controller 54 is electrically coupled to the power source 42, the light communication device 40, the electric motor 74, the actuator position sensor 46, the attitude and heading sensor 48, the system position sensor 49, the light emitting elements 50 and the imaging devices 52.

Figure 13C:
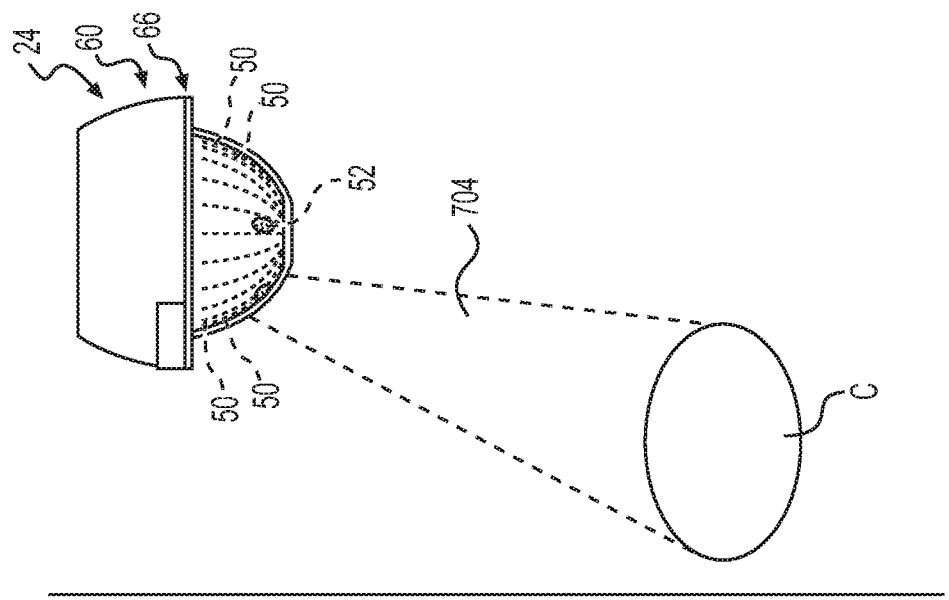
FIG. 13C is another schematic illustration of another exemplary light beam output by the light system of the search and landing light system of FIG. 1 to illuminate a third, different area.
Figure 13B:
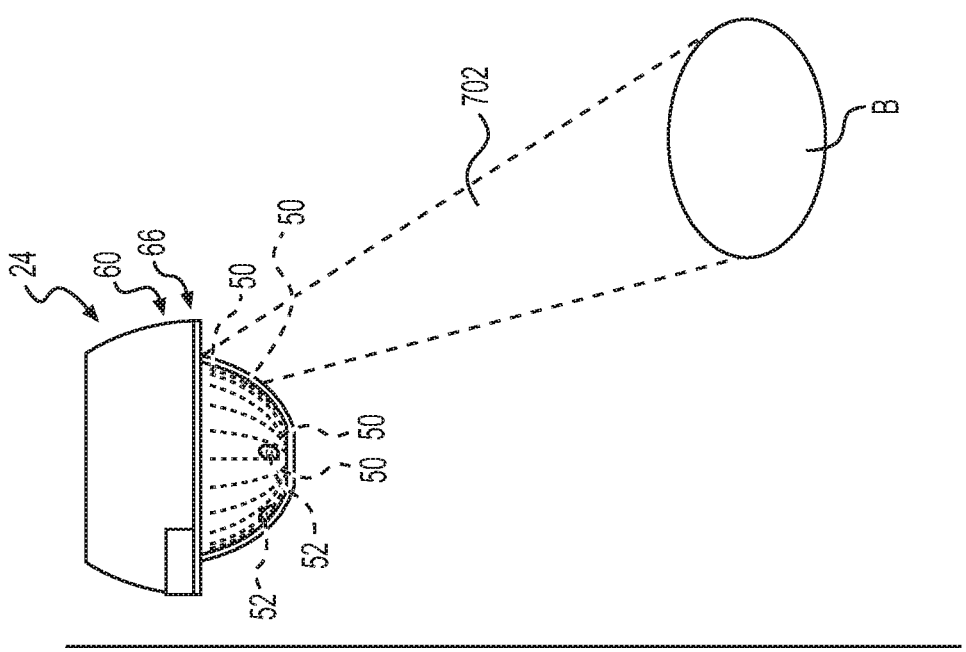
FIG. 13B is another schematic illustration of another exemplary light beam output by the light system of the search and landing light system of FIG. 1 to illuminate a second, different area.
Figure 13A:
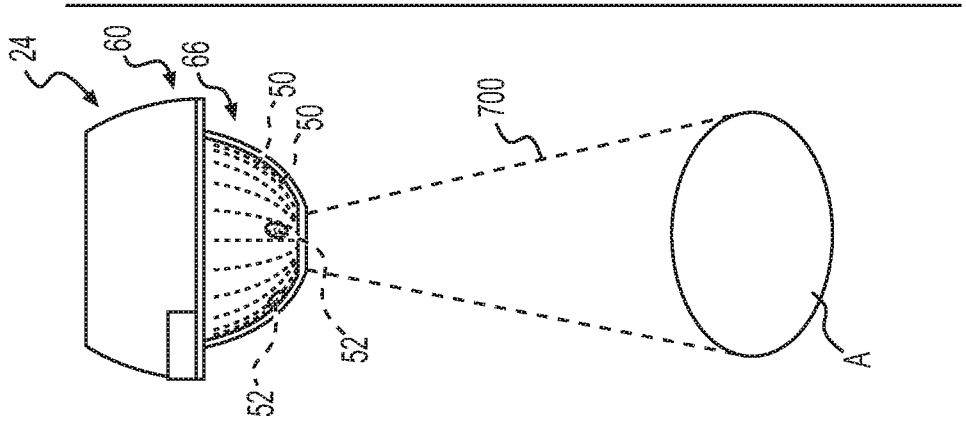
FIG. 13A is a schematic illustration of one exemplary light beam output by the light system of the search and landing light system of FIG. 1 to illuminate a first area.

As discussed, with the light system 24 assembled and coupled to the fuselage 26, the light system 24 is movable relative to the fuselage between the first, retracted position and the second, extended position. By arranging the light emitting elements 50 about the hemispherical surface 82, the light emitting elements 50 are individually actuatable or individually controllable to generate a light beam to illuminate a particular region without requiring a further movement of the light system 24 or additional actuators to position the light system 24 relative to the rotorcraft 12 to illuminate the particular region. For example, with reference to FIG. 13A, the light system 24 is shown to output a light beam 700 that illuminates an area A, which is vertically below the light system 24 with a yaw angle of about 0 degrees and a pitch angle of about 0 degrees. Without moving or repositioning the light system 24, with reference to FIG. 13B, different light emitting elements 50 are activated by the light controller 54 to output a light beam 702 to illuminate an area B, which is located away from the light system 24 with a yaw angle of about 180 degrees and a pitch angle of about 45 degrees. Without moving or repositioning the light system 24, with reference to FIG. 13C, different light emitting elements 50 are activated by the light controller 54 to output a light beam 704 to illuminate an area C, which is located away from the light system 24 with a yaw angle of about 10 degrees and a pitch angle of about 30 degrees. Thus, the light system 24 is able to output light beams at various locations relative to the rotorcraft 12 without requiring a movement of the light system 24 through the activation of different ones of the light emitting elements 50. The reduction in actuators reduces a weight and a cost of the search and landing light system 10, while also reducing maintenance time and improving system reliability. In addition, given that the light beam position is changeable based on the control of the light emitting elements 50, the light system 24 slews at a higher rate and is more responsive than lighting systems that employ multiple actuators to position a single light beam.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A search and landing light system for a vehicle, comprising:
   a hemispherical housing adapted to couple to the vehicle;
   a plurality of light emitting elements coupled to the hemispherical housing and arranged about a surface of the hemispherical housing, each of the plurality of light emitting elements configured to output a light beam;
   a controller, having a processor in communication with each of the plurality of light emitting elements and configured to output one or more control signals to selectively activate at least one of the plurality of light emitting elements to output the light beam at a selected position relative to the vehicle; and
   at least one camera coupled to the surface of the hemispherical housing between adjacent ones of the plurality of light emitting elements and in communication with the controller, and the at least one camera is configured to generate an image data stream for display on a display associated with the vehicle.

2. The search and landing light system of claim 1, further comprising at least one sensor positioned within the hemispherical housing and in communication with the controller.

3. The search and landing light system of claim 2, wherein the at least one sensor is selected from the group comprising an attitude and heading reference system and an inertial measurement unit.

4. The search and landing light system of claim 1, further comprising a plurality of switches associated with the plurality of light emitting elements, and the controller is configured to correlate a local coordinate of the light beam output by each of the plurality of light emitting elements to a switching number associated with the particular light emitting element and to activate one of the plurality of switches to output the light beam at the selected position relative to the vehicle.

5. The search and landing light system of claim 1, further comprising:
   a source of input data that provides a mode for an operation of the search and landing light system; and
   the controller is configured to output the one or more control signals to the at least one of the plurality of light emitting elements based on the mode.

6. The search and landing light system of claim 5, wherein the mode is a slew mode, and the controller is configured to output the one or more control signals to the at least one of the plurality of light emitting elements based on the slew mode.

7. The search and landing light system of claim 5, wherein the mode is a home mode, and the controller is configured to output the one or more control signals to the at least one of the plurality of light emitting elements to output the light beam in a fixed orientation relative to the vehicle.

8. The search and landing light system of claim 5, wherein the mode is an object tracking mode, the source of input data further comprises a target for tracking, and the controller is configured to output the one or more control signals to the at least one of the plurality of light emitting elements to output the light beam to illuminate the target.

9. The search and landing light system of claim 8, wherein the controller is configured to determine an amount of correction for the output of the light beam based on the image data stream received from the at least one camera.

10. The search and landing light system of claim 5, wherein the source of input is a human-machine interface in communication with the controller and remote from the hemispherical housing.

11. The search and landing light system of claim 1, further comprising an actuator assembly coupled to the hemispherical housing and configured to couple to the vehicle, the actuator assembly in communication with the controller and responsive to one or more control signals from the controller to move the hemispherical housing relative to the vehicle, and the actuator assembly is configured to move the hemispherical housing relative to the vehicle between a retracted position, in which the hemispherical housing is contained within the vehicle, and an extended position, in which the housing extends through an opening defined in the vehicle.

12. A method for generating a search and landing light, comprising:
    receiving, by a processor, a source of a mode of operation for at least one light associated with a mobile platform;
    determining, by the processor, based on the mode, at least one light emitting element of a plurality of light emitting elements coupled to a surface of a hemispherical housing to activate to emit a light beam;
    outputting, by the processor, one or more control signals to the at least one light emitting element of the plurality light emitting elements to output the light beam based on the mode;
    receiving, by the processor, an image data stream from a plurality of cameras coupled to the surface of the hemispherical housing, the plurality of cameras coupled to the surface of the hemispherical housing so as to be spaced apart about the surface and positioned between adjacent ones of the plurality of light emitting elements; and
    generating, by the processor, user interface data for rendering a user interface on a display associated with the vehicle that includes the image data stream.

13. The method of claim 12, wherein the receiving, by the processor, the source of the mode of operation for the at least one light further comprises:
    receiving, by the processor, a normal slew mode or true slew mode of operation for the at least one light;
    determining, by the processor, based on the normal slew mode or true slew mode, the at least one light emitting element of the plurality of light emitting elements to activate to output the light beam; and
    outputting, by the processor, the one or more control signals to the at least one light emitting element of the plurality light emitting elements to output the light beam based on the normal slew mode or true slew mode.

14. The method of claim 12, wherein the receiving, by the processor, the source of the mode of operation for the at least one light further comprises:
    receiving, by the processor, a source of a position for the light beam;
    determining, by the processor, based on the position, the at least one light emitting element of the plurality of light emitting to activate to output the light beam; and
    outputting, by the processor, the one or more control signals to the at least one light emitting element of the plurality light emitting elements to output the light beam at the position.

15. The method of claim 12, wherein the receiving, by the processor, the source of the mode of operation for the at least one light further comprises:
    receiving, by the processor, a source of a target for tracking with the light beam and sensor data from a sensor coupled to the hemispherical housing;
    determining, by the processor, a current position of the light beam on ground based on the sensor data;
    determining, by the processor, based on the image data stream, whether a position of the light beam is different from the current position of the light beam;
    determining, by the processor, an amount of correction based on the determining that the position of the light beam is different;
    determining, by the processor, based on the amount of correction, the at least one light emitting element of the plurality of light emitting to activate to output a corrected light beam; and
    outputting, by the processor, one or more control signals to the at least one light emitting element of the plurality light emitting elements to output the corrected light beam.

16. A search and landing light system for a vehicle, comprising:
    a human-machine interface including an input device that receives a mode of operation for the search and landing light system;
    a housing configured to couple to the vehicle;
    a plurality of light emitting elements coupled to the housing and arranged about a surface of the housing, each of the plurality of light emitting elements configured to output a light beam;
    an actuator assembly coupled to the housing and configured to couple to the vehicle, the actuator assembly configured to move the housing relative to the vehicle between a retracted position, in which the housing is contained within the vehicle, and an extended position, in which the housing extends through an opening defined in the vehicle; and
    a controller, having a processor in communication with each of the plurality of light emitting elements, the actuator assembly and the human-machine interface, the controller configured to output one or more control signals to selectively activate at least one of the plurality of light emitting elements to output the light beam based on the mode and to output one or more control signals to the actuator assembly to move the housing to the extended position or the retracted position.

17. The search and landing light system of claim 16, further comprising a plurality of cameras coupled to the surface of the housing so as to be spaced apart about the surface of the housing and positioned between adjacent ones of the plurality of light emitting elements, the plurality of cameras generate an image data stream, and further comprising a display associated with the human-machine interface, wherein the controller is configured to generate user interface data for rendering a user interface on the display that includes the image data stream.

18. The search and landing light system of claim 16, wherein the mode is an object tracking mode, the human-machine interface receives a target for tracking, and the controller is configured to output the one or more control signals to the at least one of the plurality of light emitting elements to output the light beam to illuminate the target.

* * * * *